US012659376B1

(12) United States Patent
Steele et al.

(10) Patent No.: US 12,659,376 B1
(45) Date of Patent: Jun. 16, 2026

(54) COLLABORATIVE ARTIFICIAL INTELLIGENCE PLATFORM WITH REAL-TIME MULTI-USER INTERACTION AND INTELLIGENT TASK ROUTING

(71) Applicant: Listening Post Inc., Nashville, TN (US)

(72) Inventors: Seth Steele, Nashville, TN (US); Daniel Steele, Nashville, TN (US)

(73) Assignee: Listening Post Inc., Nashville, TN (US)

( * ) Notice: Subject to any disclaimer, the term of this patent is extended or adjusted under 35 U.S.C. 154(b) by 0 days.

(21) Appl. No.: 19/292,251

(22) Filed: Aug. 6, 2025

(51) Int. Cl.
| | |
|---|---|
| *H04L 67/14* | (2022.01) |
| *G06F 11/34* | (2006.01) |
| *G06F 40/30* | (2020.01) |
| *G06Q 10/101* | (2023.01) |
| *H04L 51/216* | (2022.01) |

(52) U.S. Cl.
CPC .......... *H04L 67/14* (2013.01); *G06F 11/3404* (2013.01); *G06F 40/30* (2020.01); *G06Q 10/101* (2013.01); *H04L 51/216* (2022.05)

(58) Field of Classification Search
CPC .... G06F 9/5005; G06F 9/5027; G06F 9/5033; G06F 9/5044; G06F 9/5055; G06F 11/34; G06F 11/3404; G06F 11/3409; G06F 40/30; G06F 40/40; G06N 3/0475; G06Q 10/101; H04L 51/216; H04L 67/14; H04L 67/141; H04L 67/142
See application file for complete search history.

(56) References Cited

U.S. PATENT DOCUMENTS

| | | | | |
|---|---|---|---|---|
| 12,481,517 | B1 * | 11/2025 | Zhang | G06F 40/30 |
| 2024/0305589 | A1 * | 9/2024 | Dan | H04L 51/216 |
| 2024/0362518 | A1 * | 10/2024 | Yerli | G06Q 10/101 |
| 2024/0412720 | A1 * | 12/2024 | Vasylyev | G06F 40/35 |
| 2025/0088357 | A1 * | 3/2025 | Naanaa | G06F 40/30 |

(Continued)

OTHER PUBLICATIONS

Prasad, Ajay, "Automated Selection and Orchestration of Custom AI Agents", Technical Disclosure Commons, (Jul. 17, 2025) https://www.tdcommons.org/dpubs_series/8372 (Year: 2025).*

(Continued)

*Primary Examiner* — Vivek Srivastava
*Assistant Examiner* — William C Mcbeth
(74) *Attorney, Agent, or Firm* — Sidharth Kapoor; Pierson Ferdinand LLP

(57) ABSTRACT

A collaborative artificial intelligence platform enables real-time multi-user interaction through automatic generation of unique shareable sessions with granular permission controls. The system implements novel real-time prompt modification capabilities that allow users to update and refine AI processing tasks while they are actively executing, using sophisticated interrupt handling algorithms and state checkpointing mechanisms to preserve computational work. An intelligent task routing system monitors performance metrics of multiple AI agents and dynamically selects optimal agents based on empirical benchmarks and task characteristics. The platform organizes conversations into hierarchical threading structures with cross-thread context management, semantic analysis for conflict detection, and global context state maintenance.

20 Claims, 8 Drawing Sheets

(56)            References Cited

U.S. PATENT DOCUMENTS

2025/0118022 A1*    4/2025  Fitzmaurice ........... G06N 20/00
2025/0165296 A1*    5/2025  Hwang ................... G06F 40/30
2025/0307783 A1*  10/2025  Mathavadoss ..... G06Q 10/1093
2025/0384215 A1*  12/2025  Pine ...................... G06F 40/216
2025/0384330 A1*  12/2025  Riscutia ................. G06N 20/00

OTHER PUBLICATIONS

Mao, Manqing, et al. "Multi-user chat assistant (MUCA): a framework using LLMS to facilitate group conversations." arXiv preprint arXiv:2401.04883 (2024). (Year: 2024).*

* cited by examiner

REAL-TIME PROMPT
MODIFICATION DURING AI
PROCESSING

PERFORMANCE OPTIMIZATION AND SCALABILITY ARCHITECTURE

COLLABORATIVE ARTIFICIAL INTELLIGENCE PLATFORM WITH REAL-TIME MULTI-USER INTERACTION AND INTELLIGENT TASK ROUTING

BACKGROUND

The rapid advancement of artificial intelligence (AI) technologies has led to widespread adoption of AI-powered tools across various industries and applications. However, current AI interaction paradigms are primarily designed for individual users working in isolation, creating significant limitations when teams need to collaborate on AI-assisted tasks.

Existing collaborative software platforms such as Google Docs™, Microsoft Teams®, and Slack® have successfully demonstrated the value of real-time multi-user collaboration for document editing, communication, and project management. These platforms enable multiple users to work simultaneously on shared content with features including real-time editing, user presence indicators, permission management, and persistent session storage. However, these collaboration paradigms have not been effectively adapted for artificial intelligence interaction, leaving a significant gap in the market for collaborative AI tools.

Current AI platforms such as ChatGPT®, Claude™, and various specialized AI agents are designed primarily for individual interaction. While some platforms like ChatGPT®, Teams™ and similar offerings provide team access to AI tools, they lack sophisticated real-time collaboration features. Users typically work in separate sessions and must manually share results, leading to fragmented workflows and inefficient collaboration processes.

Several technical challenges have prevented the development of effective collaborative AI platforms. First, artificial intelligence processing typically involves complex computational workflows that are difficult to interrupt or modify once initiated. Traditional AI systems are designed to process complete prompts from start to finish without external intervention, making real-time collaboration challenging. Second, maintaining context awareness across multiple simultaneous conversations requires sophisticated natural language processing and state management capabilities that exceed the scope of simple chat applications. Third, coordinating multiple users' inputs with AI processing systems requires advanced synchronization and conflict resolution mechanisms that do not exist in current platforms.

The field of AI agent orchestration has emerged to address some of these challenges by coordinating multiple specialized AI agents to complete complex tasks. Systems such as IBM®'s AI Agent Orchestration platform and Microsoft®'s Magnetic-One™ demonstrate the potential for intelligent task routing and agent coordination. However, these systems focus on automated agent-to-agent interaction rather than human-AI collaboration, and they lack the real-time multi-user features necessary for effective team collaboration.

Recent developments in real-time communication technologies, including WebSocket protocols, real-time databases, and distributed computing architectures, have created the technical foundation necessary to support sophisticated collaborative AI platforms. Additionally, advances in natural language processing and context management have made it feasible to maintain coherent AI understanding across multiple simultaneous conversation threads.

Despite these technological advances, no existing platform successfully combines real-time multi-user collaboration with sophisticated AI interaction capabilities. Current solutions require users to choose between effective collaboration tools and advanced AI capabilities, creating inefficiencies and limiting the potential for AI-assisted teamwork.

There exists a significant need in the art for a collaborative artificial intelligence platform that enables multiple users to work together seamlessly with AI agents in real-time, providing sophisticated threading capabilities, intelligent task routing, and the ability to modify AI processing dynamically based on collaborative input.

SUMMARY

The inventive concepts disclosed herein generally relate to collaborative artificial intelligence systems and more particularly to a platform that enables multiple users to interact with artificial intelligence agents in real-time through dynamically generated shareable sessions with advanced threading capabilities, real-time prompt modification during processing, and intelligent task routing based on performance benchmarks.

The present invention provides a collaborative artificial intelligence platform that enables multiple users to interact with AI agents simultaneously through dynamically generated shareable sessions. The platform addresses the technical challenges of coordinating real-time human collaboration with artificial intelligence processing through several novel innovations.

The system disclosed herein automatically generates unique shareable sessions or unique shareable links when AI interaction sessions are initiated, enabling seamless team collaboration without complex setup procedures. Users can join sessions through these links and are assigned roles with granular permissions similar to collaborative document editing platforms. The platform supports persistent sessions that users can return to and continue working on over extended periods.

According to an example embodiment, the real-time prompt modification capability that allows users to update and refine prompts while AI systems are actively processing them. Unlike conventional AI systems that must complete processing before accepting new input, the present system incorporates modifications mid-processing through sophisticated interrupt handling and state management techniques. This enables dynamic collaboration where team members can refine requests based on partial results or changing requirements without restarting the entire process.

The platform implements an advanced threading system that organizes conversations into expandable, hierarchical structures similar to modern messaging applications. Users can create sub-conversations that branch from main threads, enabling parallel exploration of different aspects of a problem without disrupting ongoing work. The system provides real-time visibility into user activity, showing which threads team members are working in.

A central manager agent coordinates all user interactions and AI processing through intelligent task routing based on empirical performance data. The manager agent analyzes incoming prompts and decomposes complex requests into discrete tasks. This ensures that tasks are handled by the most capable and efficient AI resources available.

The system maintains sophisticated context awareness across all active threads, enabling AI agents to understand relationships between different conversations and identify potential conflicts or contradictions. When users provide conflicting information across different threads, the system alerts the team and facilitates resolution.

The platform integrates with external data sources through network communication protocols and data exchange mechanism, allowing the manager agent to access relevant information from users' existing systems and databases. These protocols may include application programming interfaces, webhook connections, streaming protocols, message queues, or other electronic communication interfaces that facilitate data retrieval and integration. This contextual data retrieval enhances AI responses by providing relevant background information and current data.

The inventive concepts disclosed herein employs a technology-agnostic architecture that can be implemented across multiple programming platforms and integrated with various AI service providers. The system supports different types of AI agents including text generation, image creation, code assistance, data analysis, and specialized domain experts.

A collaborative artificial intelligence system is disclosed comprising: a session management module configured to automatically generates a unique shareable session or a unique shareable link upon initiation of an artificial intelligence interaction session, wherein the shareable link includes embedded permission parameters that control user access levels to the collaborative session; a real-time communication engine configured to establish and maintain bidirectional communication channels between multiple users and artificial intelligence processing systems using persistent connection protocols; a threading management system configured to organize user interactions into hierarchical conversation threads, wherein each thread maintains independent context state while participating in session-wide context awareness, and wherein the threading management system provides real-time synchronization of thread states across all session participants; a prompt modification engine configured to receive user modifications to prompts during active artificial intelligence processing and to incorporate the modifications into ongoing processing without restarting the artificial intelligence task, wherein the prompt modification engine implements interrupt handling mechanisms and state preservation techniques to maintain processing continuity; a manager agent configured to receive user prompts, decompose complex prompts into discrete subtasks, and route each subtask to an optimal artificial intelligence agent based on empirical performance benchmarks collected over a predetermined time period; and a context management system configured to maintain awareness of semantic relationships between different conversation threads and to detect conflicts between user inputs across multiple threads.

A computer-implemented method for collaborative artificial intelligence interaction comprising: receiving a request to initiate a collaborative artificial intelligence session from a first user; automatically generating a unique session identifier and creating a shareable uniform resource locator that incorporates the session identifier and permission parameters; establishing a persistent communication channel with the first user and additional users who access the session through the shareable uniform resource locator; receiving a first prompt from the first user and initiating artificial intelligence processing of the first prompt; receiving a modification to the first prompt from a second user while the artificial intelligence processing is actively executing; and analyzing a current processing state of the artificial intelligence system to determine compatibility of the modification with ongoing processing; incorporating the modification into the ongoing artificial intelligence processing without restarting the processing task when the modification is determined to be compatible; generating a modified result that reflects both the original prompt and the modification; and providing the modified result to all users participating in the collaborative session.

A non-transitory computer-readable medium storing instructions that, when executed by one or more processors, cause the processors to: monitor performance metrics of multiple artificial intelligence agents over a predetermined time period, wherein the performance metrics include response time, accuracy measures, and resource utilization data; calculate performance benchmarks for each artificial intelligence agent based on the monitored performance metrics; receive a task requiring artificial intelligence processing from a collaborative session involving multiple users; analyze the task to determine task characteristics including task type, complexity level, and required capabilities; select an optimal artificial intelligence agent from the multiple artificial intelligence agents based on the calculated performance benchmarks and the determined task characteristics; route the task to the selected optimal artificial intelligence agent for processing; and update the performance metrics based on results of the task processing to maintain current performance benchmarks.

The collaborative artificial intelligence system, wherein the threading management system further comprises: a thread visualization component configured to display hierarchical relationships between conversation threads using expandable and collapsible interface elements; a presence indicator system configured to show real-time user activity including which threads users are currently viewing and/or typing status within specific threads; a cross-thread context analyzer configured to identify semantic relationships between content in different threads and to generate alerts when conflicting information is detected across threads; and a thread synchronization mechanism configured to propagate thread updates to all session participants in real-time while maintaining thread-specific access controls.

The collaborative artificial intelligence system, wherein the prompt modification engine further comprises: a state checkpointing system configured to create snapshots of artificial intelligence processing state at regular intervals during task execution; a modification compatibility analyzer configured to determine whether proposed prompt modifications can be safely integrated with current processing state; a delta application mechanism configured to apply modifications using incremental changes rather than complete task restart when modifications are compatible with current processing state; and an audit trail system configured to record all modifications made during processing including user identification, timestamp information, and specific modification content.

The collaborative artificial intelligence system, wherein the manager agent further comprises: a task decomposition module configured to analyze complex user prompts and identify discrete subtasks that can be processed independently or in parallel; a performance benchmarking system configured to collect and analyze performance data from artificial intelligence agents on a weekly basis, wherein the performance data includes task completion time, result quality metrics, and user satisfaction ratings; a routing algorithm configured to select optimal artificial intelligence agents for each subtask using weighted decision matrices that consider historical performance, current availability, and task-specific requirements; and a result integration system configured to combine outputs from multiple artificial intelligence agents into coherent responses for users.

The collaborative artificial intelligence system, further comprising: a data integration framework configured to connect with external data sources through network communication protocols and data exchange mechanisms such as, for example, application programming interfaces and webhook connections; a contextual retrieval system configured to automatically identify and access relevant information from connected data sources based on analysis of user prompts and task requirements; a query generation module configured to create appropriate queries for different data source types including relational databases, document repositories, and web-based services; and a security management system configured to enforce access controls and encryption for all external data connections while maintaining audit logs of data access activities.

A computer-implemented method for managing context across multiple conversation threads in a collaborative artificial intelligence system comprising: maintaining a plurality of conversation threads within a collaborative artificial intelligence session, wherein each thread includes a sequence of user inputs and artificial intelligence responses; analyzing semantic content of messages posted to each conversation thread using natural language processing techniques; identifying relationships between content in different conversation threads based on semantic similarity, topic overlap, and contextual relevance; detecting potential conflicts between user inputs across different conversation threads by comparing semantic content and identifying contradictory statements or requirements; generating conflict alerts when contradictory information is detected across multiple threads; maintaining a global context state that incorporates information from all active conversation threads; and providing the global context state to artificial intelligence agents to enable context-aware responses that consider information from multiple threads.

The collaborative artificial intelligence system, further comprising: a user presence system configured to track and display real-time user activity including active thread participation, typing indicators, and cursor position information; a collaborative editing interface configured to allow multiple users to modify shared content simultaneously with real-time synchronization of changes; a permission management system configured to assign and enforce role-based access controls including creator, editor, and viewer permissions with granular capability restrictions; a session persistence mechanism configured to store all session data including conversation history, thread structures, and user interactions for long-term access and continuation; and a notification system configured to alert users of relevant activities including new messages, thread updates, and artificial intelligence task completions.

The collaborative artificial intelligence system, further comprising: a load balancing system configured to distribute user sessions and artificial intelligence processing tasks across multiple server instances based on current utilization and capacity; a caching mechanism configured to store frequently accessed data and intermediate results to reduce response times and computational overhead; a resource management system configured to optimize memory usage, connection pooling, and processing resource allocation for high concurrent usage; a monitoring system configured to track system performance metrics including response times, throughput, and error rates with automated alerting capabilities; and a scaling system configured to automatically adjust system capacity based on usage patterns and performance requirements.

A computer-implemented method for managing collaborative artificial intelligence sessions comprising: receiving a session initiation request from a user; generating a cryptographically secure unique session identifier; creating a shareable uniform resource locator that incorporates the session identifier and default permission parameters; establishing a persistent data storage structure for the session including conversation history, thread organization, and user participation records; receiving join requests from additional users accessing the shareable uniform resource locator; authenticating additional users and assigning role-based permissions based on the default permission parameters and user credentials; maintaining real-time synchronization of session state across all participating users; implementing session persistence mechanisms that allow users to disconnect and reconnect while preserving session continuity; and providing session management controls that allow authorized users to modify permissions, add or remove participants, and configure session settings.

The collaborative artificial intelligence system, further comprising: a model-agnostic integration framework configured to interface with diverse artificial intelligence services including text generation, image creation, code analysis, and data processing systems an adaptive communication system configured to automatically detect and utilize optimal communication protocols for different artificial intelligence services including REST APIs, GraphQL endpoints, and WebSocket connections; a service discovery mechanism configured to identify available artificial intelligence capabilities and maintain current information about service status and capabilities; an error handling system configured to provide fallback mechanisms and alternative routing when primary artificial intelligence services are unavailable; a custom integration interface configured to support integration of proprietary artificial intelligence models and specialized domain-specific agents.

The collaborative artificial intelligence system, further comprising: an authentication system configured to support multiple authentication methods including single sign-on, multi-factor authentication, and API key-based access; an encryption system configured to encrypt all data transmission using industry-standard protocols and to encrypt stored data using advanced encryption standards; a privacy control system configured to implement data anonymization, field-level access restrictions, and compliance with privacy regulations; an audit logging system configured to record all user activities, system operations, and data access events with tamper-resistant storage and cryptographic integrity verification; and a threat detection system configured to monitor user behavior patterns and system access logs to identify and respond to potential security threats.

An apparatus for collaborative artificial intelligence interaction comprising: one or more processors; memory coupled to the one or more processors; a network interface configured to establish communication with multiple user devices and external artificial intelligence services; a session management component stored in the memory and executable by the one or more processors, the session management component configured to create and manage collaborative artificial intelligence sessions with automatic link generation and permission control; a real-time communication component stored in the memory and executable by the one or more processors, the real-time communication component configured to maintain persistent bidirectional communication channels with multiple users; a threading component stored in the memory and executable by the one or more processors, the threading component configured to organize conversations into hierarchical structures with cross-thread context awareness; a prompt modification component stored in the memory and executable by the one or more processors, the prompt modification component configured to enable real-time modification of artificial intelligence prompts during processing; and a routing component stored in the memory and executable by the one or more processors, the routing component configured to select optimal artificial intelligence agents based on empirical performance benchmarks.

The collaborative artificial intelligence system, further comprising: a user interface system configured to provide visual representation of conversation threads using expandable hierarchical displays; a real-time collaboration interface configured to show user presence indicators, and activity feeds across multiple conversation threads; a prompt modification interface configured to allow users to preview and apply modifications to active artificial intelligence tasks with visual feedback about modification impact; a permission management interface configured to provide intuitive controls for setting user roles, access levels, and session-specific policies; a mobile-optimized interface configured to provide full functionality on smartphone and tablet devices with touch-based interaction methods; and an accessibility interface configured to support users with disabilities through screen reader compatibility, keyboard navigation, and alternative input methods.

In some aspects, the techniques described herein relate to a collaborative artificial intelligence system including: one or more processors; a memory coupled to the one or more processors; a session management component stored in the memory and executable by the one or more processors, the session management component configured to: automatically generate a unique session identifier in response to a session initiation request from a first user, create a shareable uniform resource locator incorporating the session identifier and permission parameters, and establish persistent communication channels with multiple users accessing the session through the shareable uniform resource locator; a threading management component stored in the memory and executable by the one or more processors, the threading management component configured to organize conversations into a plurality of hierarchical conversation threads within the collaborative session; a prompt modification component stored in the memory and executable by the one or more processors, the prompt modification component configured to: receive a modification to an artificial intelligence processing task from a second user while artificial intelligence processing of the task is actively executing, analyze a current processing state of the artificial intelligence system to determine compatibility of the modification with ongoing processing, and incorporate the modification into the ongoing artificial intelligence processing without restarting the processing task when the modification is determined to be compatible; and a routing component stored in the memory and executable by the one or more processors, the routing: calculates performance benchmarks for each artificial intelligence agent based on monitored performance metrics, analyzes tasks to determine task characteristics including task type and complexity level, and selects an optimal artificial intelligence agent from the multiple artificial intelligence agents based on the calculated performance benchmarks and the determined task characteristics.

In some aspects, the techniques described herein relate to a system, wherein the prompt modification component further includes a state checkpointing system configured to create snapshots of artificial intelligence processing state at regular intervals during task execution, and a delta application mechanism configured to apply modifications using incremental changes rather than complete task restart when modifications are compatible with current processing state.

In some aspects, the techniques described herein relate to a system, further including a context management component stored in the memory and executable by the one or more processors, the context management component configured to analyze semantic content of messages across multiple conversation threads, identify relationships between content in different conversation threads, and maintain a global context state that incorporates information from all active conversation threads.

In some aspects, the techniques described herein relate to a system, wherein the context management component is further configured to detect potential conflicts between user inputs across different conversation threads by comparing semantic content and identifying contradictory statements, and generate conflict alerts when contradictory information is detected.

In some aspects, the techniques described herein relate to a system, further including a data integration framework configured to connect with external data sources through application programming interfaces and webhook connections, and a contextual retrieval system configured to automatically identify and access relevant information from connected data sources based on analysis of user prompts and task requirements.

In some aspects, the techniques described herein relate to a system, further including a real-time communication component stored in the memory and executable by the one or more processors, the real-time communication component configured to maintain persistent bidirectional communication channels with multiple users and provide real-time synchronization of session state across all participating users.

In some aspects, the techniques described herein relate to a system, further including a permission management system configured to assign and enforce role-based access controls including creator, editor, and viewer permissions with granular capability restrictions, and a user presence system configured to track and display real-time user activity including active thread participation and typing indicators.

In some aspects, the techniques described herein relate to a system, further including a load balancing system configured to distribute user sessions and artificial intelligence processing tasks across multiple server instances based on current utilization and capacity, and an auto-scaling system configured to automatically adjust system capacity based on usage patterns and performance requirements.

In some aspects, the techniques described herein relate to a system, further including a security framework including multiple security layers including an authentication gateway for user authentication and access control, an encryption engine for data protection, and an audit logging system for comprehensive monitoring and compliance tracking.

In some aspects, the techniques described herein relate to a system, wherein the routing component implements a task decomposition module configured to break down complex tasks into subtasks and distribute the subtasks across multiple artificial intelligence agents based on agent capabilities and performance benchmarks.

In some aspects, the techniques described herein relate to a system, further including a user interface system configured to provide visual representation of conversation threads using expandable hierarchical displays, and a collaborative editing interface configured to allow multiple users to modify shared content simultaneously with real-time synchronization of changes and visual feedback about modification impact.

In some aspects, the techniques described herein relate to a computer-implemented method for collaborative artificial intelligence interaction including: receiving a session initiation request from a first user; automatically generating a unique session identifier in response to the session initiation request; creating a shareable uniform resource locator incorporating the session identifier and permission parameters; establishing persistent communication channels with multiple users accessing the session through the shareable uniform resource locator; organizing conversations into a plurality of hierarchical conversation threads within the collaborative session; receiving a modification to an artificial intelligence processing task from a second user while artificial intelligence processing of the task is actively executing; analyzing a current processing state of the artificial intelligence system to determine compatibility of the modification with ongoing processing; incorporating the modification into the ongoing artificial intelligence processing without restarting the processing task when the modification is determined to be compatible; monitoring performance metrics of multiple artificial intelligence agents; calculating performance benchmarks for each artificial intelligence agent based on the monitored performance metrics; analyzing tasks to determine task characteristics including task type and complexity level; and selecting an optimal artificial intelligence agent from the multiple artificial intelligence agents based on the calculated performance benchmarks and the determined task characteristics.

In some aspects, the techniques described herein relate to a computer-implemented method, further including creating snapshots of artificial intelligence processing state at regular intervals during task execution, and applying modifications using incremental changes rather than complete task restart when modifications are compatible with current processing state.

In some aspects, the techniques described herein relate to a computer-implemented method, further including analyzing semantic content of messages across multiple conversation threads, identifying relationships between content in different conversation threads, and maintaining a global context state that incorporates information from all active conversation threads.

In some aspects, the techniques described herein relate to a computer-implemented method, further including detecting potential conflicts between user inputs across different conversation threads by comparing semantic content and identifying contradictory statements, and generating conflict alerts when contradictory information is detected.

In some aspects, the techniques described herein relate to a computer-implemented method, further including connecting with external data sources through application programming interfaces and webhook connections, and automatically identifying and accessing relevant information from connected data sources based on analysis of user prompts and task requirements.

In some aspects, the techniques described herein relate to a computer-implemented method, further including maintaining persistent bidirectional communication channels with multiple users and providing real-time synchronization of session state across all participating users.

In some aspects, the techniques described herein relate to a computer-implemented method, further including assigning and enforcing role-based access controls including creator, editor, and viewer permissions with granular capability restrictions, and tracking and displaying real-time user activity including active thread participation and typing indicators.

In some aspects, the techniques described herein relate to a computer-implemented method, further including distributing user sessions and artificial intelligence processing tasks across multiple server instances based on current utilization and capacity, and automatically adjusting system capacity based on usage patterns and performance requirements.

In some aspects, the techniques described herein relate to a computer-implemented method, further including breaking down complex tasks into subtasks and distributing the subtasks across multiple artificial intelligence agents based on agent capabilities and performance benchmarks.

BRIEF DESCRIPTION OF FIGURES

The disclosed aspects will hereinafter be described in conjunction with the appended drawings, provided to illustrate and not to limit the disclosed aspects, wherein like designations denote like elements.

DETAILED DESCRIPTION

Figure 1:
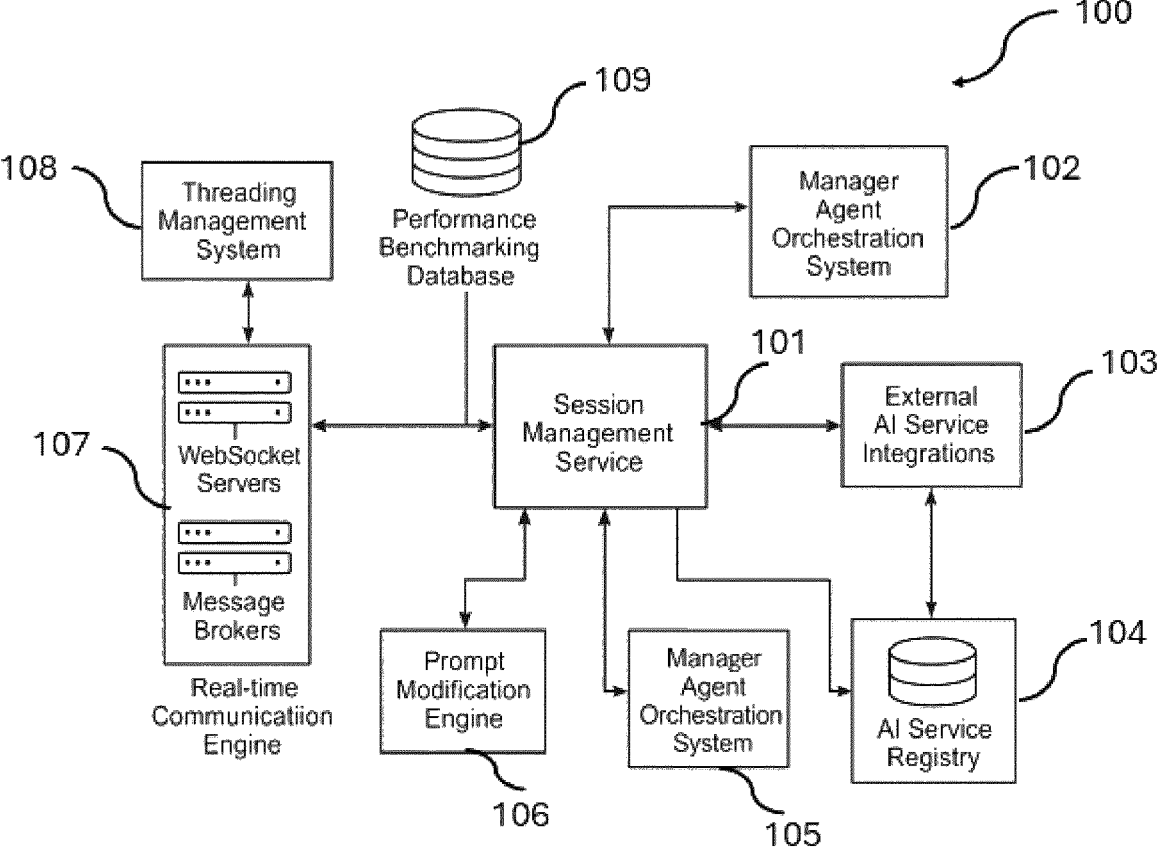
FIG. 1 illustrates the overall system architecture of the collaborative artificial intelligence platform showing the interconnection between major system components.

The present disclosure can be understood more readily by reference to the instant detailed description, examples, and claims. The present disclosure is not limited to the example embodiments and/or methods disclosed herein, which may, of course, vary. It is also to be understood that the terminology used herein is for the purpose of describing particular embodiments only and is not intended to be limiting. Unless defined otherwise, all technical and scientific terms used herein have the same meaning as commonly understood by one of ordinary skill in the art.

A collaborative artificial intelligence platform enables multiple users to interact with AI agents simultaneously through dynamically generated shareable sessions with real-time threading, prompt modification, and intelligent task routing capabilities. The system automatically generates unique shareable sessions or unique shareable links upon session initiation with integrated permission management allowing controlled team collaboration. An advanced threading system organizes conversations into hierarchical structures with cross-thread context awareness and conflict detection. A novel prompt modification engine allows users to update prompts during active AI processing through sophisticated interrupt handling and state preservation techniques. A manager agent implements intelligent task routing based on empirical performance benchmarks collected over time, decomposing complex prompts into discrete subtasks and selecting optimal AI agents for each task. The platform supports integration with diverse AI services and external data sources while maintaining comprehensive security, privacy, and performance optimization features. The system addresses fundamental challenges in human-AI collaboration by providing seamless real-time multi-user interaction with artificial intelligence systems.

One skilled in the art would appreciate that the processing entities may comprise traditional AI agents, large language models (LLMs), frontier models, foundation models, distributed neural network components, neuromorphic computing modules, quantum-inspired processing units, specialized model instances, federated learning nodes, edge computing devices, or other AI computational paradigms that may emerge as the technology evolves. The system's architecture is designed to be paradigm-agnostic, capable of interfacing with current agent-based architectures, transformer-based language models, multimodal foundation models, as well as future AI processing methodologies including neuro-symbolic systems, hyperdimensional computing frameworks, multi-modal reasoning engines, or hybrid quantum-classical AI systems. This approach ensures the platform can adapt to technological shifts such as the evolution from large language models to Large Action Models (LAMs), the emergence of agentic meshes with standardized Agent-to-Agent protocols, the development of next-generation frontier models with enhanced reasoning capabilities, or entirely new AI paradigms like neuromorphic computing architectures that mimic biological neural networks. By abstractly referring to "artificial intelligence processing entities" and "computational units," the system maintains compatibility with present-day AI technologies including current LLMs and frontier models, as well as future innovations in distributed intelligence, ensuring the invention remains valuable regardless of how AI processing architectures evolve.

The collaborative artificial intelligence platform of the present invention has broad industrial applicability across numerous sectors and use cases where teams need to work together effectively with AI systems. The platform addresses fundamental challenges in human-AI collaboration that exist across many industries and organizational contexts.

In the business and enterprise sector, the platform enables teams to collaborate on complex business problems using AI assistance for tasks such as strategic planning, market analysis, financial modeling, and operational optimization. The real-time collaboration features allow team members to refine AI prompts based on their expertise and organizational knowledge, while the intelligent routing ensures that different aspects of business problems are handled by the most appropriate AI capabilities.

In the software development industry, the platform supports collaborative code development, system design, and technical problem-solving using AI assistance. Development teams can work together to analyze code quality, identify security vulnerabilities, optimize performance, and generate documentation while maintaining coherent context across different aspects of the development process.

In the education sector, the platform enables collaborative learning experiences where students and instructors can work together with AI tutors, research assistants, and educational tools. The threading system allows exploration of different learning paths while maintaining overall educational coherence, and the real-time modification capabilities enable dynamic adjustment of learning activities based on student progress and understanding.

The platform's technology-agnostic architecture and flexible integration capabilities make it suitable for deployment across diverse technical environments and organizational contexts. The scalable architecture supports everything from small team collaboration to large enterprise deployments with thousands of concurrent users.

FIG. 1 illustrates the overall system architecture 100 of the collaborative artificial intelligence platform showing the interconnection between major system components. The diagram shows the session management service 101 at the center, connected to the real-time communication engine 107, threading management system 108, prompt modification engine 106, manager agent orchestration system 105, and external AI service integrations 103. The architecture 100 demonstrates the distributed microservices design that enables scalable and reliable operation.

The collaborative artificial intelligence platform of the present invention comprises several interconnected components that work together to provide seamless real-time multi-user AI interaction. The system architecture 100 is designed using distributed microservices principles to ensure scalability, reliability, and performance under high concurrent usage.

The core system includes a session management service 101 that handles the creation, management, and persistence of collaborative AI sessions. When a user initiates a new AI interaction, the session management service 101 automatically generates a unique session identifier and creates a corresponding shareable URL or a session. This URL or session incorporates security tokens and permission parameters that enable controlled access to the collaborative session.

A real-time communication engine 107 manages bidirectional communication between multiple users and the AI processing systems. The communication engine 107 utilizes WebSocket protocols or similar real-time communication technologies to provide low-latency message delivery and synchronization across all session participants. The communication engine 107 maintains persistent connections with all active users and handles connection management, failover scenarios, and bandwidth optimization.

The threading management system 108 implements the advanced conversation organization capabilities that distinguish the present invention from conventional chat applications. The threading management system 108 maintains a hierarchical data structure representing the relationship between different conversation threads and sub-threads. Each thread maintains its own context and state while participating in the broader session context managed by the system.

A prompt modification engine 106 provides the novel capability for real-time prompt updates during AI processing. The prompt modification engine 106 monitors active AI processing tasks and provides interrupt mechanisms that allow safe modification of prompts without corrupting ongoing computations. The prompt modification engine 106 implements sophisticated state management techniques including checkpointing, rollback capabilities, and delta-based modification application.

The manager agent orchestration system 105 coordinates all AI interactions and implements intelligent task routing based on performance benchmarks 109. The orchestration system 105 includes task analysis capabilities that decompose complex prompts into discrete subtasks, routing algorithms 408 that select optimal AI agents based on empirical performance data, and coordination mechanisms that manage the execution and integration of results from multiple AI agents.

Session Management Service (101). The session management service 101 serves as the central orchestration hub for all collaborative AI interactions within the platform architecture 100. This service 101 maintains persistent session state information including active user participants, session permissions, conversation history, and thread hierarchies. The session management service 101 implements a stateful session registry that tracks each collaborative session's unique identifier, creation timestamp, participant roles, and current activity status.

The session management service 101 interfaces directly with the real-time communication engine 107 to coordinate user presence and activity synchronization. When new users join a session through shareable links or through shareable sessions, the session management service 101 validates permissions, initializes user context, and establishes communication channels through the real-time communication engine 107. The service 101 also coordinates with the threading management system 108 to maintain hierarchical conversation structures and ensure thread persistence across session lifecycle events.

The system disclosed herein automatically generates unique shareable access identifiers when AI interaction sessions are initiated, enabling seamless team collaboration without complex setup procedures. These access identifiers may comprise uniform resource locators, network addresses, connection identifiers, invitation codes, session tokens, or other access mechanisms that facilitate controlled entry to collaborative sessions. Users can join sessions through these access identifiers and are assigned roles with granular permissions similar to collaborative document editing platforms. The access identifiers incorporate cryptographically secure session identifiers and permission parameters that enable controlled access to the collaborative session while maintaining security and user authentication protocols. The platform supports persistent sessions that users can return to and continue working on over extended periods, with the access identifiers remaining valid for the duration of the session lifecycle. This approach provides flexibility for various access methods including web-based uniform resource locators, mobile application deep links, QR codes, invitation tokens, or other technological implementations while maintaining the core functionality of secure, permission-controlled collaborative access.

The session management service 101 implements sophisticated conflict resolution mechanisms when multiple users attempt to modify session parameters simultaneously. It maintains transaction logs of all session modifications and implements optimistic locking to prevent data corruption during concurrent operations.

Manager Agent Orchestration System (102 and 105). The manager agent orchestration system 102 functions as the primary intelligent routing and task coordination component within the architecture 100. This system 102 receives user prompts and requests from the session management service 101 and determines optimal processing strategies based on task characteristics and current system state.

The orchestration system 102 interfaces extensively with the performance benchmarking database 109 to access historical performance metrics for different AI service integrations 103. When processing incoming requests, the system 102 queries the performance benchmarking database 109 to retrieve response time data, accuracy measurements, and resource utilization statistics for available AI agents registered in the AI service registry 104.

The manager agent orchestration system 105 implements advanced task decomposition algorithms that analyze complex user prompts and identify discrete subtasks that can be processed independently or in parallel. This system 105 coordinates with the AI service registry 104 to identify available AI agents with capabilities matching identified subtask requirements.

The orchestration systems 102 and 105 work in tandem to provide redundancy and load distribution. System 102 handles primary routing decisions while system 105 manages secondary task coordination and monitors processing progress across distributed AI service integrations 103.

External AI Service Integrations (103). The external AI service integrations 103 component provides standardized connectivity interfaces to diverse artificial intelligence processing services and platforms. This component 103 implements protocol adapters for different AI service APIs including REST-based services, GraphQL endpoints, and proprietary communication protocols.

Each integration within component 103 maintains service-specific configuration parameters including authentication credentials, rate limiting settings, request formatting specifications, and response parsing rules. The integrations 103 communicate bidirectionally with the manager agent orchestration systems 102 and 105 to receive task assignments and return processing results.

The external AI service integrations 103 implement sophisticated retry mechanisms and failover capabilities to ensure reliable service availability. When primary AI services become unavailable, the integrations 103 coordinate with the AI service registry 104 to identify alternative services capable of handling pending tasks.

The component 103 also implements real-time status monitoring for connected AI services, continuously updating the AI service registry 104 with current availability status, response time metrics, and service capacity information.

AI Service Registry (104). The AI service registry 104 maintains a comprehensive database of available artificial intelligence services, their capabilities, current status, and historical performance characteristics. This registry 104 stores detailed metadata for each registered AI service including supported task types, processing capabilities, input/output formats, and service level agreements.

The AI service registry 104 interfaces continuously with the external AI service integrations 103 to maintain current service availability and performance data. The registry 104 implements automated service discovery mechanisms that can detect new AI services and register them with appropriate capability classifications.

The registry 104 provides query interfaces that allow the manager agent orchestration systems 102 and 105 to identify optimal AI services for specific task requirements. These queries consider factors such as task complexity, required capabilities, current service load, and historical performance metrics stored in the performance benchmarking database 109.

The AI service registry 104 also maintains service dependency maps that identify relationships between different AI services and enable sophisticated routing strategies that leverage complementary AI capabilities.

Prompt Modification Engine (106). The prompt modification engine 106 implements the platform's innovative real-time prompt modification capabilities during active AI processing. This engine 106 maintains communication channels with the external AI service integrations 103 to monitor processing status and identify safe intervention points for applying prompt modifications.

The engine 106 coordinates closely with the threading management system 108 to understand the context of modification requests and ensure that changes maintain consistency across related conversation threads. When users submit modifications through the real-time communication engine 107, the prompt modification engine 106 analyzes the modifications for compatibility with current processing state.

The engine 106 implements sophisticated state checkpointing mechanisms that create recovery points during AI processing cycles. These checkpoints enable the engine 106 to apply modifications without losing computational work already completed by the external AI service integrations 103.

The prompt modification engine 106 also coordinates with the session management service 101 to maintain audit trails of all modifications including user identification, timestamps, and specific modification content for compliance and debugging purposes.

Real-Time Communication Engine (107). The real-time communication engine 107 provides the foundational communication infrastructure for all multi-user collaboration features within the platform architecture 100. This engine 107 implements WebSocket-based persistent connections that maintain bidirectional communication channels between user devices and the collaborative AI platform.

The engine 107 interfaces directly with the session management service 101 to coordinate user presence indicators and activity synchronization across all active participants in collaborative sessions. The communication engine 107 implements message queuing and delivery confirmation mechanisms to ensure reliable message delivery even during network connectivity issues.

The real-time communication engine 107 coordinates with the threading management system 108 to route messages to appropriate conversation threads and maintain thread-specific user presence information. The engine 107 also provides real-time updates about AI processing status by interfacing with the manager agent orchestration systems 102 and 105.

The engine 107 implements sophisticated message prioritization and batching algorithms to optimize network utilization while maintaining responsive user experience during high-activity collaborative sessions.

Threading Management System (108). The threading management system 108 implements the platform's advanced hierarchical conversation organization capabilities. This system 108 maintains thread relationship data structures that support nested conversation threads with cross-thread context awareness and semantic relationship tracking.

The system 108 interfaces extensively with the session management service 101 to ensure thread persistence across session lifecycle events and maintain thread access permissions consistent with overall session security policies. The threading management system 108 also coordinates with the real-time communication engine 107 to provide thread-specific user presence and activity indicators.

The system 108 implements sophisticated context correlation algorithms that analyze message content across multiple threads to identify semantic relationships and potential conflicts. These algorithms interface with the prompt modification engine 106 to provide context-aware modification suggestions and conflict resolution recommendations.

The threading management system 108 also provides query interfaces that allow the manager agent orchestration systems 102 and 105 to access thread-specific context information when processing AI tasks that span multiple conversation threads.

Performance Benchmarking Database (109). The performance benchmarking database 109 stores comprehensive historical performance data for all AI service integrations 103 within the platform architecture 100. This database 109 maintains time-series data including response times, accuracy measurements, resource utilization statistics, and task completion rates for each registered AI service.

The database 109 implements sophisticated data aggregation and analysis capabilities that generate performance benchmarks used by the manager agent orchestration systems 102 and 105 for intelligent routing decisions. The database 109 calculates rolling averages, performance trends, and predictive capacity models that enable proactive task routing optimization.

The performance benchmarking database 109 interfaces with the AI service registry 104 to correlate performance data with service capability information and provide comprehensive service selection criteria for routing algorithms. The database 109 also maintains comparative analysis data that identifies optimal AI service combinations for complex multi-stage tasks.

The database 109 implements automated data retention and archiving policies to maintain historical performance trends while optimizing storage utilization for high-frequency performance monitoring data collection from the external AI service integrations 103.

Further describing FIG. 1 in additional detail. The session management service 101 implements a sophisticated message-passing architecture using protocol buffers for efficient serialization and deserialization of inter-component communications. The service 101 maintains persistent TCP connections with each core component, utilizing a custom heartbeat protocol that sends status packets every 500 milliseconds, for example, to ensure connection integrity. When the real-time communication engine 107 receives user input, it packages the data into structured message objects containing user identification tokens, session identifiers, timestamp information, and payload data, which are then transmitted to the session management service 101 via authenticated JSON-RPC calls over encrypted WebSocket connections.

The threading management system 108 interfaces with the session management service 101 through a dedicated API that supports atomic operations for thread creation, modification, and deletion. Each thread operation generates a unique transaction identifier that enables rollback capabilities in case of system failures. The system maintains thread state using a hierarchical data structure implements each node contains thread metadata including parent-child relationships, access permissions, participant lists, and content hashes for integrity verification.

The prompt modification engine 106 coordinates with multiple components through a sophisticated event-driven architecture. When modification requests are received, the engine 106 publishes events to a message broker that distributes notifications to interested components including the threading management system 108, the manager agent orchestration system 105, and the performance benchmarking database 109. This decoupled architecture ensures that prompt modifications can be processed efficiently while maintaining system responsiveness.

The session management service 101 may implement a distributed consensus algorithm based on the Raft protocol to maintain consistency across multiple server instances. Each session state change is logged as an entry in a replicated state machine, ensuring that all instances maintain identical session information. The service uses vector clocks to track causality relationships between concurrent operations, enabling conflict resolution when multiple users simultaneously modify session parameters.

State synchronization occurs through a multi-phase commit protocol that ensures atomicity of complex operations spanning multiple components. When a user initiates a collaborative session, the session management service 101 coordinates with the database cluster to create persistent storage structures, with the threading management system 108 to initialize conversation hierarchies, and with the real-time communication engine 107 to establish communication channels. Each phase must complete successfully before the next phase begins, with automatic rollback mechanisms if any phase fails.

Figure 2:
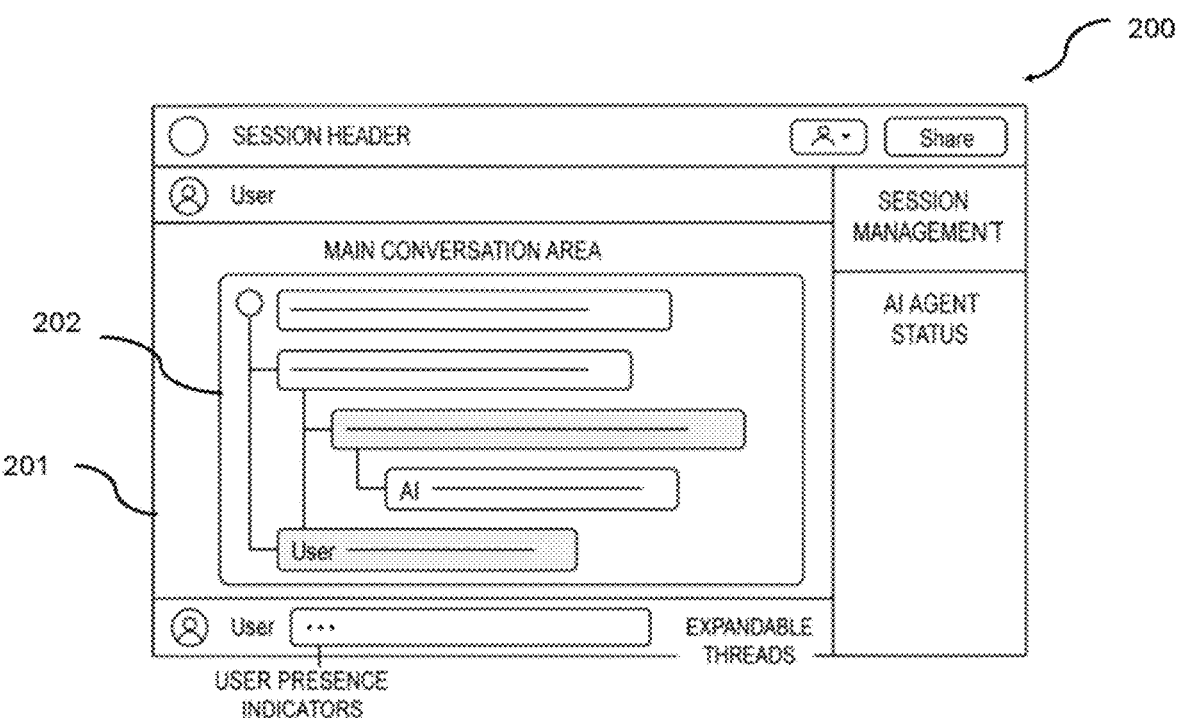
FIG. 2 illustrates the main user interface layout showing how collaborative sessions are presented to users.

FIG. 2 presents the main user interface 200 layout showing how collaborative sessions are presented to users. The interface includes a session header with participant information and sharing controls, a main conversation area with expandable thread displays, and sidebar panels for session management and AI agent status.

The user interface 200 of the present invention provides an intuitive and responsive interface designed to support effective real-time collaboration while managing the complexity of multi-threaded AI interactions. The interface design follows modern web application principles and supports both desktop and mobile device usage.

The main interface provides a unified view of the collaborative session including active threads, participant presence indicators, and real-time activity feeds. The interface uses visual design elements such as color coding, icons, and layout organization to help users navigate complex conversation structures and understand the relationships between different threads and AI interactions.

The threading interface implements expandable and collapsible thread views that allow users to focus on specific conversations while maintaining awareness of the broader session context. Thread visualization includes hierarchical indicators showing parent-child relationships, activity indicators showing recent updates, and participant indicators showing who is actively engaged in each thread.

The real-time collaboration features may include typing indicators that show when other users are composing messages, cursor position indicators for shared editing scenarios, and presence indicators that show which threads and activities other users are currently focused on. These features help coordinate collaborative efforts and reduce conflicts between simultaneous user actions.

In FIG. 2, the user interface 200 presents a unified workspace that consolidates all real-time collaborative interactions into a single view. The main display panel 201 renders the contents of the currently selected conversation thread, streaming new user inputs and AI agent responses as they arrive. This panel 201 is linked to the threading management system 108 to retrieve and display the hierarchical structure of messages, ensuring that parent-child relationships and thread metadata remain synchronized with the underlying session state maintained by the session management service 101. Whenever a user selects a different thread in the thread navigation panel 202, the main display panel 201 dynamically reloads the corresponding content without refreshing the entire interface, preserving in-flight AI processing and incremental prompt modifications. The seamless update mechanism between panels 201 and 202 leverages the real-time communication engine 107's push notifications to maintain sub-second refresh times even under heavy multi-user load.

Flanking the left side of the user interface 200, the thread navigation panel 202 provides a collapsible, hierarchical list of all active conversation threads within the session. Each entry in the panel 202 is labeled with a thread title and an activity indicator icon that pulses when new messages are posted. These icons are driven by the real-time communication engine 107, which flags updates as they occur in the threading management system 108. Selecting an entry in panel 202 causes the main display panel 201 to focus on that thread's viewport, while simultaneously emitting an event to the session management service 101 to log the context switch. The panel 202 also integrates with the permission management control so that threads restricted to certain roles appear dimmed or hidden based on the current user's access rights as enforced by the session management service 101.

Within the main display panel's thread viewport, each message—whether a user input or an AI response—is prefaced by participant presence indicators which display avatars and role badges. These indicators are continuously updated by the real-time communication engine 107 to reflect live cursor positions and edit focus areas. When multiple users edit or comment on the same message concurrently, the presence indicators split to show aggregated participation, enabling instant awareness of collaborative editing activity. The viewport also supports inline annotations for AI-generated suggestions provided by the AI suggestion panel; these annotations reference the prompt modification engine 106's incremental suggestion output, allowing users to accept or reject modifications without leaving the thread context.

Directly beneath the thread viewport lies the prompt input field, the primary entry point for submitting new queries or mid-processing modifications to active AI tasks. The field interfaces with the prompt modification engine 106 to validate compatibility of edits against the most recent processing checkpoint stored in the state checkpointing system (see FIGS. 3 and 4). Upon submission, the field transmits the updated prompt via the real-time communication engine 107 to the session management service 101, which then routes the request to the manager agent orchestration system 105. The orchestration system 105 decomposes complex prompts into subtasks, consulting the performance benchmarking database 109 to select the most suitable AI agent for each subtask, before invoking the external AI service integrations 103 to execute the requests.

On the right side of the user interface 200, the AI response area displays the outputs returned from external AI service integrations 103. Each response block in area is tethered to its originating thread via metadata keys generated by the threading management system 108, ensuring semantic continuity across the session. Users can control the verbosity of responses using the expand/collapse control; collapsing a response triggers an update in the threading management system 108 to mark that subtree as "archived" in the local view without altering the underlying session data. Performance metrics such as response time and confidence scores may be overlaid on each response, sourced from the performance benchmarking database 109 and presented via the AI response area to inform subsequent user decisions.

Running along the top of the user interface 200 is the session information bar, which displays the session ID, a shareable link, and the count of active participants. Embedded within bar is the permission management control, a dropdown that lets session creators adjust roles—creator, editor, viewer—on the fly. Whenever a role change is enacted through control, the permission update propagates immediately to the session management service 101, which authorizes or revokes UI elements such as the new thread button and thread-specific controls in panel 202 accordingly. Simultaneously, any role or permission change generates an entry in the notification area, alerting all participants to the update and logging the event for audit purposes.

Adjacent to the session information bar, the search and filter control empowers users to locate messages, threads, or AI responses by keyword, participant, or date range. Queries entered into control are parsed by the threading management system 108, which executes semantic similarity searches over the global context state and returns matching thread identifiers to panel 202. This enables rapid navigation to relevant discussion points without manual scrolling. Furthermore, the AI suggestion panel can appear contextually beneath control, offering real-time prompt-crafting recommendations generated by the prompt modification engine 106 based on ongoing conversation analysis. By selecting a suggestion from panel, the user automatically populates the prompt input field, streamlining the iterative refinement process.

Together, these supplemental interface elements enrich the collaborative experience depicted in FIG. 2, illustrating not only the visual layout of the user interface 200 but also the underlying interactions among the prompt modification engine 106, threading management system 108, manager agent orchestration systems 102 and 105, real-time communication engine 107, session management service 101, and the performance benchmarking database 109. This expanded disclosure ensures that each UI element is clearly tied to the platform's technical architecture, thereby reinforcing the inventive integration of real-time multi-user collaboration with intelligent AI task routing.

Figure 3:
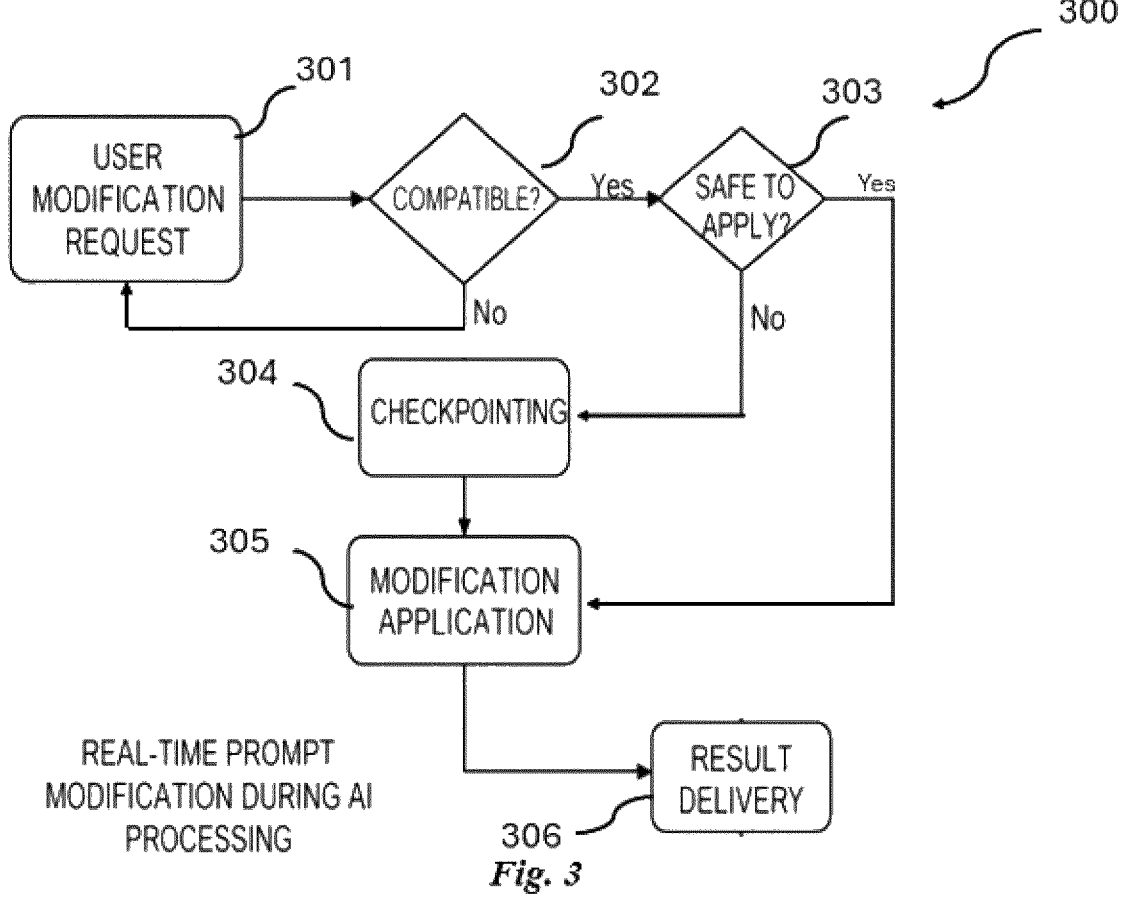
FIG. 3 illustrates the technical process flow for real-time prompt modification during AI processing.

FIG. 3 illustrates the technical process flow 300 for real-time prompt modification during AI processing. The diagram shows the sequence of operations from user modification request 301 through system analysis, state checkpointing 304, modification application 305, and result delivery 306.

According to an example embodiment of the inventive concepts, the system has the capability for users to modify prompts while AI systems are actively processing them. This feature addresses a fundamental limitation of conventional AI systems that require complete processing cycles before accepting new input.

The prompt modification engine 106 implements sophisticated interrupt handling mechanisms that allow safe intervention in ongoing AI processing tasks. When a user requests a prompt modification, the system 100 analyzes the current processing state to determine the optimal point for incorporating the changes. The system 100 maintains detailed state information about AI processing progress, including intermediate results, processing stages, and resource utilization.

The modification process begins with the system creating a checkpoint of the current processing state. This checkpoint includes all relevant context information, partial results, and processing parameters that would be needed to resume processing from the current point. The checkpointing mechanism 304 ensures that modifications can be applied without losing valuable computational work that has already been completed.

The system then analyzes the user modification request 301 to determine its compatibility with the current processing state. Simple modifications such as parameter adjustments or clarifications may be incorporated immediately without disrupting ongoing processing. More substantial modifications that change the fundamental nature of the request may require the system to complete the current processing segment before applying the changes.

The technical process flow 300 illustrated in FIG. 3 depicts the sequence of operations by which the system safely incorporates mid-processing prompt edits and returns updated AI responses. At the outset, a user-initiated edit arrives as a user modification request 301 through the real-time communication engine (107 in FIG. 1) and is registered against the current session by the session management service (101). This request 301 contains both the original prompt context and the user's proposed changes, and triggers the prompt modification engine (106) to initiate a controlled intervention within the active AI processing cycle.

Once the user modification request 301 is received, the system invokes the modification compatibility analyzer 302 to assess whether the proposed edits can be safely integrated with the existing AI computation state. The compatibility analyzer 302 compares the incoming modification against the most recent checkpoint data maintained by the state checkpointing system (304). This comparison considers factors such as required tokenizer alignment, partial result dependencies, and any resource locks held by the external AI service integration (103). If the compatibility analyzer 302 determines the edits are incompatible—for example, if they would invalidate critical partial computations—the system defers modification or prompts the user to revise the request.

If the edits are deemed compatible, the process transitions to the safety apply step 303, wherein the system creates a safe execution window to apply the changes. At the safety apply step 303, the system makes a critical determination about how to proceed with the modification request. The safety apply step 303 evaluates the current processing state and determines whether the proposed modifications can be immediately integrated without disrupting ongoing AI computations. If the safety apply determination 303 is "No"—indicating that immediate application would compromise processing integrity or create computational conflicts—the system redirects to the checkpointing step 304 to preserve the current processing state before attempting modification integration.

When the safety apply step 303 determines that modifications cannot be immediately applied, the checkpointing system 304 creates a comprehensive snapshot of the current AI processing state. During safety apply 303, the prompt modification engine (106) references the checkpointing system 304 to replay only the minimal computation segments necessary to merge the new input. The checkpointing system 304 continuously archives snapshots of the AI processing state at configurable intervals. Each checkpoint 304 captures not only the raw input tokens and partial output vectors but also the runtime context-such as model hyperparameters, memory allocations, and intermediary attention weights-such that the system may roll back or reapply only the delta changes introduced by the user modification without losing valuable processing work already completed.

Alternatively, if the safety apply determination 303 is "Yes"—indicating that the modifications can be safely integrated with the current processing state—the system bypasses additional checkpointing procedures and proceeds directly to the modification application component 305.

Following safety apply 303, the modification application component 305 executes the actual integration of the user's edits into the AI computation. The modification application 305 leverages a delta-based update mechanism that injects only the differences between the original and revised prompt into the AI service's processing pipeline. This targeted update avoids a full task restart and preserves most of the prior computational work, thereby reducing latency and conserving processing resources. During this step, the manager agent orchestration system (102/105) is notified to adjust any downstream task routing or resource allocations in light of the updated computation path.

Finally, once the AI service integration (103) completes processing the revised prompt, the system proceeds to the result delivery stage 306. In result delivery 306, the updated output is packaged with thread metadata by the threading management system (108) and sent back through the real-time communication engine (107) to the user interface (200 in FIG. 2). The session management service (101) logs the modification event, and the performance benchmarking database (109) records processing time and success metrics for the modified task. The user then sees the revised AI response appear in the main display panel (201) of the user interface (200), seamlessly woven into the existing conversation thread without a disruptive context reset.

By integrating these explicit steps—user modification request 301, compatibility checking 302, safety apply 303, checkpointing 304, modification application 305, and result delivery 306—into the prompt modification engine (106) workflow, FIG. 3 demonstrates how the platform delivers real-time, collaborative AI interactions (as depicted in FIGS. 1 and 2) while maintaining system integrity, efficiency, and coherent thread context. This expanded disclosure clarifies the underpinnings of the mid-processing edit mechanism and reinforces the inventive technical synergy among the platform's core components.

Further describing FIG. 3. The prompt modification engine 106 implements a sophisticated interrupt handling system based on cooperative multitasking principles. AI processing tasks are designed to yield control at predetermined checkpoints, allowing the system to safely intervene without corrupting computational state. The interrupt handler maintains a priority queue of pending modifications, processing high-priority changes (such as user corrections) before lower-priority optimizations.

The checkpointing mechanism 304 may create comprehensive snapshots of AI processing state using a copy-on-write strategy that minimizes memory overhead. Each checkpoint contains serialized representations of neural network activations, attention matrices, token embeddings, and intermediate computation results. The system stores checkpoints in a ring buffer with configurable retention policies, enabling rollback to any previous state within the configured time window.

Figure 4:
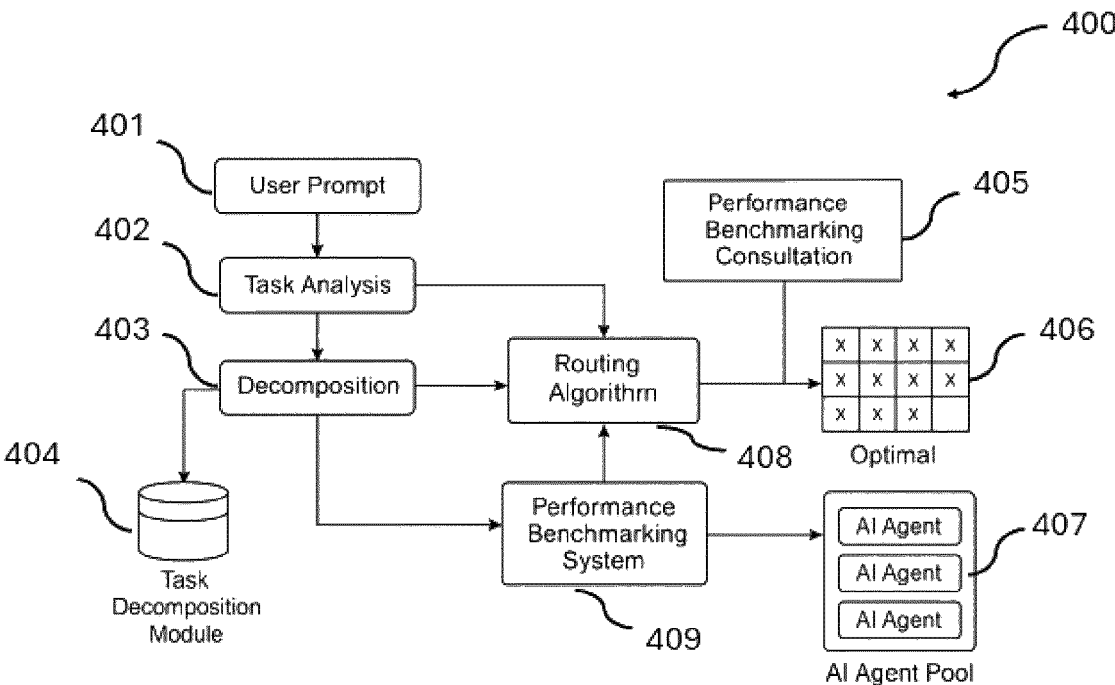
FIG. 4 depicts the intelligent task routing system implemented by the manager agent.

The modification compatibility analyzer 302 may employ a rule-based system with machine learning components to determine modification safety. The analyzer maintains a decision tree that evaluates modification types against current processing stages, using trained classifiers to predict the impact of specific changes on AI output quality. Compatible modifications are those that can be applied without significantly altering the computational path, while incompatible modifications require processing restart or staged application FIG. 4 depicts the intelligent task routing system 400 implemented by the manager agent 102. The diagram shows the flow from user prompt 401 receipt through task analysis

402, decomposition 403, performance benchmark consultation 405, and optimal agent selection 406.

The manager agent 102 component of the present invention serves as the central coordination point for all AI interactions within the collaborative platform 100. The manager agent 102 implements sophisticated task analysis 402, decomposition 403, and routing capabilities that optimize the utilization of available AI resources based on empirical performance data.

When the manager agent 102 receives a prompt 401 from users, it performs comprehensive analysis to understand the nature and requirements of the requested task 402. The analysis process includes natural language processing to extract key concepts and requirements, task classification to identify the type of AI capabilities needed, and complexity assessment to estimate resource requirements and processing time.

The task decomposition 403 process breaks complex prompts into discrete subtasks that can be handled by specialized AI agents. The decomposition algorithm identifies independent components of the request that can be processed in parallel, sequential dependencies that require ordered processing, and integration requirements for combining results from multiple AI agents. This decomposition 403 enables more efficient processing and better utilization of specialized AI capabilities.

The routing algorithm 408 selects optimal AI agents 406, 407 for each subtask based on comprehensive performance benchmarks 409 collected over time. The system maintains detailed performance metrics for each available AI agent, including response time, accuracy measures, resource utilization, and user satisfaction ratings. These metrics are updated continuously based on actual usage patterns and results.

Further describing FIG. 4, it depicts the intelligent task routing system 400, which serves as the decision-making engine that determines how user requests are processed and distributed across available AI capabilities. This system 400 works in close coordination with the manager agent orchestration system (105 from FIG. 1) to ensure that each collaborative AI task is handled by the most suitable artificial intelligence agent based on empirical performance data and task characteristics.

The routing process begins when a user prompt 401 arrives from the user interface (200 from FIG. 2) via the real-time communication engine (107). The user prompt 401 represents any request submitted through the prompt input field, whether it's an initial query from a new conversation thread or a modification request processed through the prompt modification engine (106) as illustrated in FIG. 3. Each user prompt 401 contains not only the textual content but also contextual metadata from the threading management system (108), including thread hierarchy information, participant roles, and any cross-thread context relationships identified by the semantic analysis components.

Upon receiving the user prompt 401, the system initiates the task analysis phase 402, where natural language processing algorithms examine the prompt content to identify key characteristics that will inform routing decisions. The task analysis 402 leverages the same semantic processing capabilities used by the threading management system (108) to understand context relationships, but focuses specifically on extracting task-specific attributes such as complexity indicators, required domain expertise, expected response formats, and computational resource requirements. This task analysis 402 also considers the current session state maintained by the session management service (101) to under-
stand how the new task fits within the broader collaborative
context.

Following the initial analysis, the system proceeds to the
decomposition phase 403, where complex user prompts 401
are broken down into discrete, manageable subtasks that can
be processed independently or in coordinated sequence. The
decomposition 403 process recognizes that collaborative AI
sessions often involve multifaceted requests that require
different types of AI capabilities—for example, a business
strategy prompt might need both analytical reasoning and
creative ideation components. During decomposition 403,
the system identifies these distinct requirements and creates
a structured representation of how the overall task can be
divided while maintaining logical coherence and ensuring
that subtask results can be meaningfully recombined.

The task decomposition module 404 implements the
sophisticated algorithms that power the decomposition
phase 403, utilizing machine learning models trained on
successful task breakdown patterns from the performance
benchmarking system 409. This module 404 maintains tem-
plates and heuristics for common collaborative scenarios-
such as research projects, creative brainstorming, technical
analysis, and strategic planning-allowing it to quickly iden-
tify optimal decomposition strategies for familiar task types.
The module 404 also interfaces with the threading manage-
ment system (108) to ensure that subtasks can be appropri-
ately distributed across conversation threads when multiple
discussion streams are active within the collaborative ses-
sion.

The task decomposition module 404 employs a hierarchi-
cal parsing approach that analyzes user prompts at multiple
linguistic levels. The system first performs syntactic parsing
to identify sentence structures, then applies semantic role
labeling to understand relationships between concepts.
Complex tasks are broken down using a recursive algorithm
that identifies independent subtasks based on semantic
dependency graphs.

Once tasks have been analyzed and decomposed, the
system consults the performance benchmarking consultation
component 405, which serves as the bridge between current
task requirements and historical performance data. This
consultation 405 queries the performance benchmarking
system 409 to retrieve relevant metrics for available AI
agents, focusing on performance indicators that match the
characteristics identified during task analysis 402. The con-
sultation 405 considers not only raw performance metrics
like response time and accuracy but also contextual factors
such as current system load, recent performance trends, and
the specific combination of capabilities required for the
current task.

The performance benchmarking consultation 405 pro-
duces recommendations for the optimal selection 406 of AI
agents from the available AI agent pool 407. The optimal
designation 406 represents the system's determination of
which AI agent or combination of agents will most effec-
tively handle each subtask based on the comprehensive
analysis of task requirements and agent capabilities. This
optimal 406 selection process considers multiple optimiza-
tion criteria including expected completion time, quality
metrics, resource utilization efficiency, and the agent's
recent performance trajectory as recorded in the perfor-
mance benchmarking system 409.

The AI agent pool 407 represents the collection of avail-
able artificial intelligence services and capabilities acces-
sible through the external AI service integrations (103 from
FIG. 1). Each agent in the AI agent pool 407 is registered with detailed capability profiles, current availability status,
and performance history maintained by the AI service reg-
istry (104). The pool 407 includes diverse AI agents with
specialized capabilities such as natural language processing,
mathematical computation, creative writing, code genera-
tion, data analysis, and domain-specific expertise. The
dynamic nature of the pool 407 allows for real-time agent
discovery and integration, enabling the system to adapt to
new AI capabilities as they become available.

The routing algorithm 408 orchestrates the final assign-
ment of decomposed tasks to selected AI agents, implement-
ing sophisticated scheduling and coordination logic that
optimizes overall system performance while meeting col-
laborative session requirements. This algorithm 408 consid-
ers dependencies between subtasks, required sequencing for
complex multi-step processes, and the need to maintain
coherent context across distributed processing. The routing
algorithm 408 also coordinates with the real-time commu-
nication engine (107) to provide status updates to collab-
orative session participants and manages the integration of
results back into the appropriate conversation threads
through the threading management system (108).

The routing algorithm 408 may implement a constraint
satisfaction problem solver that optimizes agent assignment
across multiple objectives simultaneously. The system con-
structs decision matrices where rows represent available AI
agents and columns represent task requirements, with cell
values indicating compatibility scores.

The optimization process uses a modified Hungarian
algorithm enhanced with real-time constraint checking. The
algorithm considers not only static agent capabilities but
also dynamic factors such as current load, estimated comple-
tion time, and resource availability. For complex tasks
requiring multiple agents, the system employs genetic algo-
rithms to find optimal agent combinations that minimize
overall completion time while maximizing result quality.

Throughout this process, the performance benchmarking
system 409 continuously collects performance data from
completed tasks, feeding this information back into the
consultation component 405 to improve future routing deci-
sions. The system 409 tracks metrics such as task comple-
tion times, user satisfaction ratings, accuracy measurements,
and resource utilization patterns, creating a comprehensive
performance profile for each AI agent in the pool 407. This
data enables the intelligent task routing system 400 to
continuously improve its routing decisions and adapt to
changing performance characteristics of available AI agents.

The entire intelligent task routing system 400 integrates
seamlessly with the broader collaborative AI platform archi-
tecture, receiving user prompts through the interface com-
ponents shown in FIG. 2, coordinating with the real-time
modification capabilities illustrated in FIG. 3, and utilizing
the foundational infrastructure components depicted in FIG.
1. This integration ensures that the sophisticated routing
intelligence operates transparently within the collaborative
user experience while optimizing the underlying AI process-
ing efficiency and effectiveness.

Figure 5:
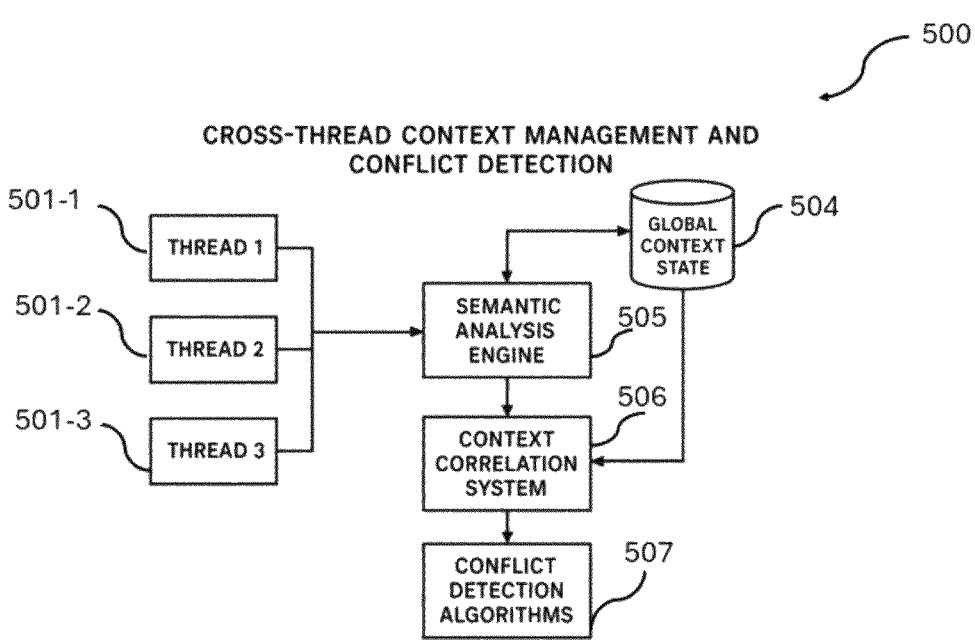
FIG. 5 illustrates the context management system that maintains awareness across multiple conversation threads and detects potential conflicts between user inputs.

FIG. 5 illustrates the context management system 500 that
maintains awareness across multiple conversation threads
501-1 to 501-3 and detects potential conflicts between user
inputs. The diagram shows the semantic analysis compo-
nents that process thread content 501-1 to 501-3 and identify
relationships between different conversations.

The threading system of the present invention implements
sophisticated conversation organization that goes beyond
simple linear chat interfaces. The system maintains a hier-
archical thread structure that allows users to create branching conversations while preserving the overall context 504 and coherence of the collaborative session.

Each thread within the system maintains its own conversation history, context state 504, and participant list while participating in the broader session context. Users can create new threads at any point in a conversation, enabling parallel exploration of different topics or approaches without disrupting ongoing discussions. The threading system provides visual indicators showing the relationship between threads and sub-threads, making it easy for users to navigate complex conversation structures.

The threading system integrates with AI context management 506. The system maintains awareness of the semantic relationships between different threads 501-1 to 501-3 and can identify when conversations in separate threads relate to similar topics or contain conflicting information 507. This cross-thread context awareness enables more sophisticated AI responses that take into account the full scope of the collaborative session.

Further discussing FIG. 5, it depicts the sophisticated context management system 500, which serves as the cognitive backbone of the collaborative AI platform by maintaining comprehensive awareness across all active conversation threads and ensuring semantic coherence throughout complex multi-user sessions. This system 500 integrates closely with the threading management system (108 from FIG. 1) and the intelligent task routing system (400 from FIG. 4) to provide contextually-aware AI processing that considers the full collaborative session history.

The system 500 continuously monitors multiple conversation threads, illustrated here as Thread 1 (501-1), Thread 2 (501-2), and Thread 3 (501-3), which represent discrete discussion streams within a collaborative session initiated through the user interface (200 from FIG. 2). Each thread 501-1, 501-2, and 501-3 maintains its own local conversation history and participant interactions, but the context management system 500 ensures that insights and information developed within each thread are available to inform processing across the entire collaborative session. This multi-thread awareness enables the platform to provide more intelligent and contextually relevant AI responses than systems that treat each conversation in isolation.

Thread 1 (501-1) typically represents the primary conversation stream where users initiate the core collaborative task or discussion topic. This Thread 1 501-1 often contains the foundational context and objectives that guide the overall session direction. The context management system 500 designates certain threads as primary context sources, giving additional weight to the semantic content and contextual information derived from Thread 1 (501-1) when processing requests from other threads. The system continuously analyzes the content flow within Thread 1 (501-1) to identify key concepts, objectives, constraints, and decisions that should influence AI processing across the broader collaborative session.

Thread 2 (501-2) and Thread 3 (501-3) represent additional conversation streams that may explore related topics, alternative approaches, or specialized aspects of the primary discussion. These threads 501-2 and 501-3 can be spawned from the primary thread or initiated independently by collaborative session participants. The context management system 500 maintains bidirectional awareness between all threads, ensuring that insights developed in Thread 2 (501-2) or Thread 3 (501-3) can inform AI processing for requests submitted to Thread 1 (501-1) and vice versa. This cross-thread context sharing enables more sophisticated collaborative workflows where teams can explore multiple approaches simultaneously while maintaining overall coherence.

Next, the Global Context State 504 serves as the comprehensive knowledge repository that aggregates and synthesizes information from all active threads 501-1, 501-2, and 501-3. The Global Context State 504 maintains a continuously updated representation of the current collaborative session's complete context, including identified topics, established facts, user preferences, decisions made, constraints identified, and relationships between different discussion elements. This state 504 is structured using advanced knowledge representation techniques that enable efficient querying and contextual reasoning by AI agents accessing the system through the external AI service integrations (103 from FIG. 1).

The Global Context State 504 interfaces directly with the intelligent task routing system (400 from FIG. 4) to provide contextual information that influences routing decisions. When the task analysis component (402) evaluates user prompts, it consults the Global Context State 504 to understand how new requests relate to previously established context and ongoing discussions. This contextual awareness enables the routing algorithm (408) to select AI agents that not only have appropriate technical capabilities but also access to the relevant contextual background needed to provide coherent responses.

The semantic analysis engine 505 provides the natural language processing capabilities that enable the context management system 500 to understand and analyze the content within each conversation thread 501-1, 501-2, and 501-3. This engine 505 employs advanced natural language processing techniques including entity recognition, topic modeling, sentiment analysis, and semantic similarity detection to extract meaningful insights from user inputs and AI responses. The semantic analysis engine 505 works continuously in the background, processing new messages as they arrive through the real-time communication engine (107 from FIG. 1) and updating the Global Context State 504 with newly identified concepts, relationships, and contextual elements.

The semantic analysis engine 505 also coordinates with the prompt modification engine (106 from FIG. 1) to ensure that real-time prompt modifications are evaluated within the full contextual framework of the collaborative session. When users submit modifications through the process illustrated in FIG. 3, the semantic analysis engine 505 analyzes these changes to understand their implications within the broader session context and provides input to the modification compatibility analyzer (302) regarding contextual consistency and coherence.

The semantic analysis engine 505 may implement a multi-layered neural architecture combining transformer-based encoders with graph neural networks for relationship modeling. The system processes incoming messages through a pipeline that includes tokenization, embedding generation, attention-based encoding, and semantic role labeling. Each message is represented as a high-dimensional vector that captures both syntactic structure and semantic meaning. The engine 505 maintains dynamic knowledge graphs that represent concepts, entities, and relationships discussed across all conversation threads. New information is integrated using graph neural networks that update node embeddings and edge weights based on semantic similarity and co-occurrence patterns. The system employs attention mechanisms to focus on relevant context when processing new inputs, enabling efficient scaling to long conversation histories.

The context correlation system 506 implements sophisticated algorithms that identify and maintain relationships between information and discussions across different threads 501-1, 501-2, and 501-3. The context correlation system 506 goes beyond simple keyword matching to understand semantic relationships, causal connections, temporal dependencies, and logical relationships between concepts discussed in different conversation streams. The correlation system 506 creates a dynamic network of relationships that enables the platform to provide contextually aware responses that draw upon insights from across the entire collaborative session.

When processing new user requests through the intelligent task routing system (400), the context correlation system 506 identifies relevant context from other threads that should influence AI processing. For example, if Thread 1 (501-1) establishes certain constraints or preferences, and a user subsequently submits a request in Thread 2 (501-2), the correlation system 506 ensures that the AI agent selected by the routing algorithm (408) has access to those constraints through the Global Context State 504. This correlation capability enables sophisticated collaborative workflows where teams can work on related tasks across multiple threads while maintaining consistency and leveraging insights developed throughout the session.

The conflict detection algorithms 507 provide critical quality assurance capabilities by identifying potential contradictions, inconsistencies, or conflicting requirements that emerge across different conversation threads 501-1, 501-2, and 501-3. These algorithms 507 continuously analyze the content processed by the semantic analysis engine 505 to identify situations where information or decisions established in one thread conflict with content in other threads.

The conflict detection algorithms 507 employ both rule-based logical reasoning and machine learning approaches to identify various types of conflicts including factual contradictions, incompatible requirements, conflicting preferences, and logical inconsistencies.

When the conflict detection algorithms 507 identify potential conflicts, they generate alerts that are communicated to collaborative session participants through the real-time communication engine (107) and displayed in the user interface (200 from FIG. 2). These alerts include detailed information about the nature of the conflict, the specific threads and messages involved, and suggested approaches for resolution. The conflict detection system also provides input to the intelligent task routing system (400) to prevent AI agents from receiving conflicting instructions that could result in incoherent or contradictory responses.

The conflict detection algorithms 507 also integrate with the prompt modification engine (106) to evaluate proposed prompt modifications for potential conflicts with established session context. When users attempt to modify active AI tasks through the process shown in FIG. 3, the conflict detection algorithms 507 analyze the proposed changes against the Global Context State 504 to identify potential inconsistencies and provide warnings before modifications are applied.

The conflict detection algorithms 507 may implement a sophisticated reasoning system that identifies various types of conflicts including factual contradictions, logical inconsistencies, and requirement incompatibilities. The system maintains a belief network that represents stated facts and their confidence levels, using Bayesian inference to identify potential conflicts when new information is added. The algorithm employs weighted confidence measures that consider factors such as source reliability, temporal proximity, and supporting evidence. When conflicts are detected, the system generates detailed reports that include the conflicting statements, supporting evidence, and recommended resolution approaches.

Together, these components of the context management system 500 create a sophisticated cognitive infrastructure that enables intelligent collaborative AI interactions. The system maintains comprehensive awareness of complex multi-thread discussions while providing quality assurance through conflict detection and ensuring that AI processing is informed by the full collaborative context. This contextual intelligence distinguishes the platform from simpler chat-based AI systems and enables the sophisticated collaborative workflows that make the platform valuable for complex team-based AI-assisted tasks.

The context management system 500 represents a crucial integration point that connects the user interface components (FIG. 2), the real-time prompt modification capabilities (FIG. 3), and the intelligent task routing system (FIG. 4) into a coherent collaborative AI platform that can handle the complexity and nuance of real-world team collaboration scenarios.

Figure 6:
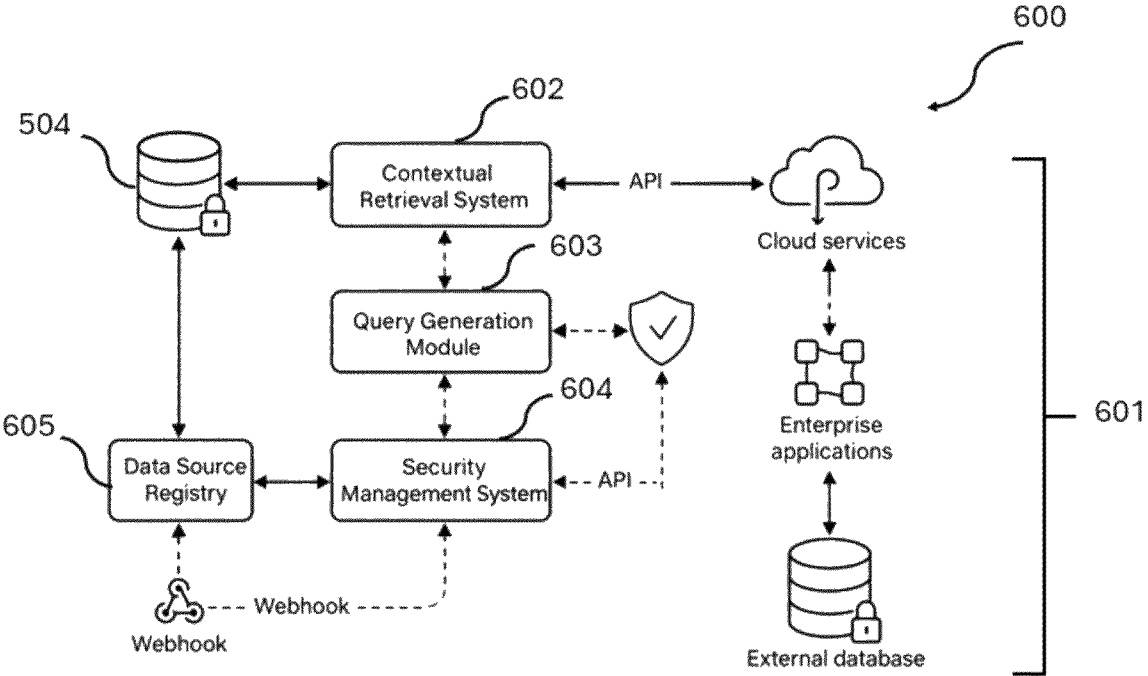
FIG. 6 presents the data integration framework that enables AI agents to access relevant contextual information from external data sources.

FIG. 6 presents the data integration framework 600 that enables AI agents to access relevant contextual information from external data sources 601. The diagram shows the various connection types supported including database connections, API integrations, and webhook configurations.

The collaborative AI platform of the present invention includes sophisticated data integration capabilities that enable AI agents to access and utilize relevant contextual information from users' existing systems and databases. This integration enhances the quality and relevance of AI responses by providing current and comprehensive background information.

The data integration framework supports connection to diverse data sources including relational databases, document management systems, cloud storage services, enterprise applications, and web-based APIs. The framework implements standardized connection protocols and data access methods that can be configured for different organizational environments and security requirements.

The system includes intelligent data discovery capabilities that help identify relevant information sources for specific AI tasks. When processing user prompts, the manager agent analyzes the content and context to determine which data sources might contain relevant information. The discovery process considers factors such as data source content types, access permissions, data freshness, and relevance to the current task.

FIG. 6 illustrates the comprehensive data integration framework 600, which serves as the platform's gateway to external information sources, enabling AI agents to access real-time data from across the enterprise ecosystem. This framework 600 works in seamless coordination with the intelligent task routing system (400 from FIG. 4) and the context management system (500 from FIG. 5) to ensure that AI responses are grounded in current, authoritative data rather than relying solely on static training knowledge.

The foundation of this integration capability lies in the diverse external data sources 601, which encompass three primary categories of information repositories that modern organizations depend upon. Cloud services represent the first category, including platforms such as AWS™ S3™ buckets for document storage, Google BigQuery™ for analytical datasets, and Azure Data Lake™ for large-scale data processing. These cloud-based sources 601 typically expose REST APIs or GraphQL endpoints that enable programmatic access to stored information, allowing the framework 600 to retrieve everything from historical transaction records to real-time sensor data streams.

Enterprise applications constitute the second category of external data sources 601, including ERP systems that contain business logic and operational data, CRM platforms with customer relationship information, project management tools with task and timeline data, and specialized industry applications with domain-specific knowledge. These enterprise sources 601 often provide both API-based access for structured queries and webhook capabilities for real-time event notifications, enabling the framework 600 to stay synchronized with changing business conditions and operational updates.

The third category encompasses external databases, both relational and NoSQL systems, that may be hosted on-premises or in virtual private cloud environments. These database sources 601 provide direct access to structured and semi-structured data through SQL queries, document-based retrieval mechanisms, or specialized query languages depending on the database technology. The framework 600 supports connections to traditional relational databases like PostgreSQL™ and MySQL™ as well as modern NoSQL solutions like MongoDB™ and Elasticsearch™.

The platform my integrate with external data sources through the Model Context Protocol (MCP) and other network communication protocols and data exchange mechanisms, enabling access to relevant information from users' existing systems and databases. The Model Context Protocol represents an emerging industry standard for connecting AI applications to external data sources, tools, and services through a standardized, model-agnostic interface. MCP functions as a universal communication layer that eliminates the traditional N×M integration problem by providing a single protocol that AI applications can use to connect with diverse external systems. The platform's MCP integration enables seamless connection to MCP-compliant servers that provide access to databases, APIs, file systems, web services, and specialized tools without requiring custom integration code for each data source. This standardized approach allows the manager agent to access comprehensive contextual information from a growing ecosystem of MCP-enabled services, improving the quality and accuracy of collaborative AI interactions while reducing integration complexity and development overhead.

The adaptive communication system is configured to automatically detect and utilize optimal communication protocols for different artificial intelligence services and data sources, including the Model Context Protocol (MCP), REST APIs, GraphQL endpoints, WebSocket connections, and other emerging standards. The system implements MCP client capabilities that enable discovery and connection to MCP servers, providing standardized access to external tools, databases, and services through the protocol's transport mechanisms including HTTP with Server-Sent Events (SSE) and standard input/output (stdio) connections. The MCP integration supports dynamic capability discovery, allowing the system to identify available tools and data sources at runtime and automatically configure appropriate connection parameters and authentication mechanisms. This protocol-agnostic approach ensures compatibility with both current AI service architectures and emerging standards like MCP, enabling the platform to leverage the benefits of standardized AI-to-system integration while maintaining backward compatibility with existing custom integrations and proprietary APIs.

Central to the framework's operation is the data source registry 605, which maintains a comprehensive catalog of all configured external data sources 601 and their associated metadata.

The data source registry 605 stores critical connection information including endpoint URLs, authentication credentials, supported query languages, data schemas, refresh rates, and access permissions for each connected source. The data source registry 605 also tracks operational status information such as connection health, response time metrics, and availability patterns, enabling the framework 600 to make intelligent routing decisions when multiple sources could potentially satisfy a data request.

The data source registry 605 interfaces closely with the intelligent task routing system (400 from FIG. 4) to provide source recommendations when the task analysis component (402) identifies that external data would enhance AI processing. When a user prompt submitted through the user interface (200 from FIG. 2) requires current information that exceeds the AI agent's training knowledge, the data source registry 605 is consulted to identify relevant sources that match the required data characteristics and access permissions.

The contextual retrieval system 602 implements the sophisticated logic that determines what information to fetch from external data sources 601 and when to initiate these retrieval operations. This system 602 analyzes user prompts using semantic analysis capabilities derived from the semantic analysis engine (505 from FIG. 5) to identify specific information needs that could be satisfied by external data. The retrieval system 602 makes intelligent decisions about whether to perform synchronous data fetching for immediate response enhancement or asynchronous background retrieval for context enrichment.

The contextual retrieval system 602 coordinates with the Global Context State (504 from FIG. 5) to ensure that fetched external data is properly integrated into the collaborative session's overall knowledge base. When external information is successfully retrieved, the system 602 normalizes the data into standardized formats and updates the Global Context State 504, making the information immediately available to AI agents processing subsequent requests within the collaborative session.

The query generation module 603 provides the technical translation layer that converts high-level information requests into executable queries appropriate for specific external data sources 601. This module 603 maintains templates and transformation logic for different source types, enabling it to generate SQL queries for relational databases, construct REST API calls with appropriate parameters, formulate GraphQL documents for modern web services, and create specialized queries for document repositories and search engines.

The query generation module 603 leverages schema information stored in the data source registry 605 to ensure that generated queries conform to each source's specific requirements and constraints. This includes handling different authentication methods, respecting rate limiting policies, formatting parameters according to API specifications, and structuring responses for optimal parsing and integration into the collaborative session context.

The security management system 604 provides comprehensive protection for all external data interactions, implementing zero-trust security principles throughout the data integration framework 600. This system 604 manages authentication credentials using encrypted storage mechanisms, ensuring that API keys, OAuth tokens, and database passwords are protected against unauthorized access. The security system 604 also implements role-based access controls that mirror the permission management established through the session management service (101 from FIG. 1).

When external data requests are initiated, the security management system 604 validates that the requesting user has appropriate permissions to access the specified data sources 601 based on their role within the collaborative session and any organizational access policies. The system 604 also implements comprehensive audit logging that tracks all external data access attempts, successful retrievals, and any security-related events, providing compliance teams with detailed records of data access patterns and potential security incidents.

The security management system 604 coordinates with the real-time communication engine (107 from FIG. 1) to handle webhook-based data updates securely, validating incoming webhook signatures and implementing rate limiting to prevent abuse. This ensures that external systems can push real-time updates to the collaborative AI platform while maintaining security and system stability.

The integration of these components creates a powerful data ecosystem that enhances the collaborative AI platform's capabilities significantly. When users submit prompts through the prompt input field (206 from FIG. 2), the intelligent task routing system (400) can consult the data source registry 605 to identify relevant external information sources. The contextual retrieval system 602 then coordinates with the query generation module 603 to fetch current data, while the security management system 604 ensures all interactions comply with organizational security policies.

This retrieved external data flows into the Global Context State (504) where it becomes available to the semantic analysis engine (505) and context correlation system (506), enabling AI agents to provide responses that incorporate both their training knowledge and current real-world information. The conflict detection algorithms (507) can also analyze external data for consistency with session context, alerting users when retrieved information contradicts previously established facts or assumptions.

The data integration framework 600 represents a crucial advancement that transforms the collaborative AI platform from a closed system relying solely on pre-trained knowledge into an open, connected platform that can access and leverage an organization's complete information ecosystem. This capability ensures that collaborative AI sessions can produce actionable insights based on current data, making the platform valuable for dynamic business environments where decisions must be based on the most recent available information.

Figure 7:
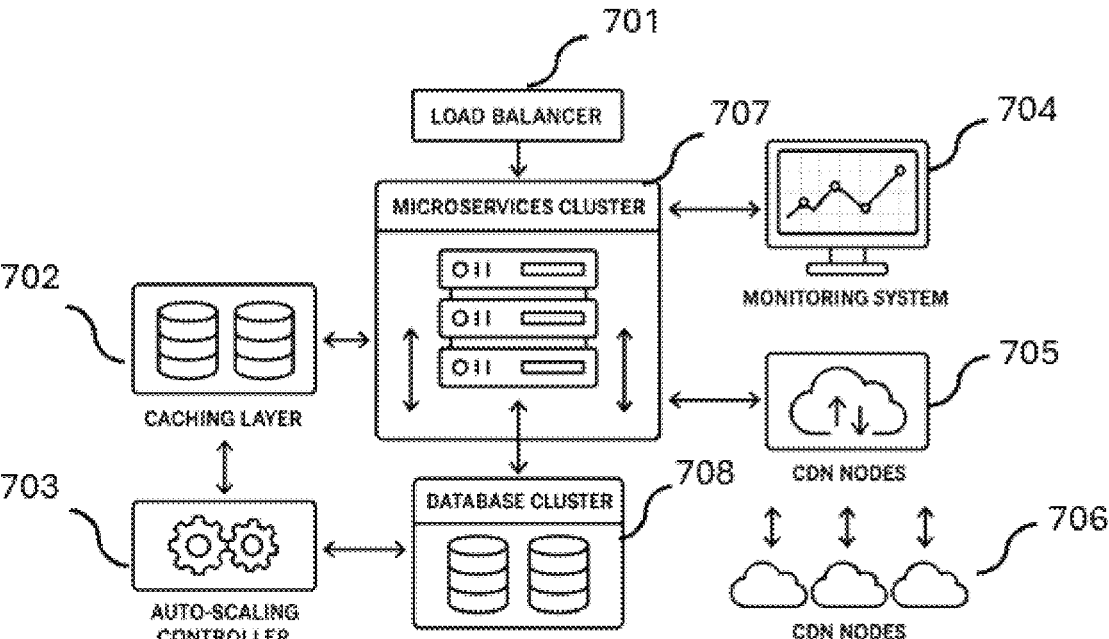
FIG. 7 illustrates the performance optimization and scalability features of the collaborative AI platform.

FIG. 7 illustrates the performance optimization and scalability features of the collaborative AI platform. The diagram shows the distributed architecture with load balancing 701, caching layers 702, auto-scaling controller 703; monitoring system 704; CDN Nodes 705; another CDN Nodes 706; microservices cluster 707; and database cluster 708.

The collaborative AI platform implements comprehensive performance optimization and scalability features to support high concurrent usage while maintaining responsive user experience. The system architecture is designed using cloud-native principles that enable horizontal scaling across multiple servers and data centers.

The microservices architecture allows independent scaling of different system components based on usage patterns and performance requirements. Components that experience high load, such as the real-time communication engine or AI processing coordination, can be scaled independently without affecting other system functions. This targeted scaling approach optimizes resource utilization and cost efficiency.

The system implements intelligent load balancing across multiple server instances to distribute user sessions and AI processing tasks efficiently. The load balancing algorithm considers factors such as server capacity, current utilization, geographic location, and specialized capabilities when routing requests. This ensures optimal performance for users regardless of their location or the complexity of their AI tasks.

FIG. 7 depicts the comprehensive performance optimization and scalability architecture that enables the collaborative AI platform to maintain responsive user experiences while supporting high concurrent usage across distributed deployment environments. This architecture works in close coordination with all core system components illustrated in previous figures, ensuring that the session management service (101 from FIG. 1), real-time communication engine (107), and intelligent task routing system (400 from FIG. 4) can operate efficiently under varying load conditions and user demands.

The load balancing component 701 serves as the intelligent traffic distribution system that ensures optimal resource utilization across all platform components. The load balancer 701 receives incoming requests from users accessing the collaborative AI platform through the user interface (200 from FIG. 2) and distributes these requests across available server instances based on current capacity, response times, and specialized capabilities. This component 701 implements sophisticated routing algorithms that consider not only basic server utilization metrics but also the specific nature of different request types, ensuring that computationally intensive AI processing tasks are routed to appropriately configured instances while real-time communication requests are handled by servers optimized for low-latency interactions.

The load balancing system 701 maintains continuous communication with the monitoring system 704 to receive real-time performance data that informs routing decisions. When certain server instances experience elevated load due to complex AI processing tasks initiated through the intelligent task routing system (400), the load balancer 701 automatically adjusts its routing algorithms to direct new sessions to less heavily utilized instances. This dynamic load distribution ensures that the real-time prompt modification capabilities illustrated in FIG. 3 remain responsive even during peak usage periods, as the system can allocate additional resources to handle the computational demands of mid-processing prompt updates.

The load balancing system 701 implements adaptive algorithms that respond to changing traffic patterns and server performance characteristics. The system uses exponentially weighted moving averages to track server performance metrics and adjusts routing weights dynamically based on observed response times and error rates. The traffic distribution algorithm considers multiple factors including geographic proximity, server specialization, and current load. For AI processing tasks, the system implements affinity routing that directs related requests to servers with appropriate model caches, reducing initialization overhead and improving response times.

The caching layers 702 provide sophisticated data storage and retrieval optimization that significantly enhances system performance by reducing redundant computations and data access operations. These caching mechanisms 702 operate at multiple levels throughout the platform architecture, including session-level caching for frequently accessed conversation threads maintained by the threading management system (108 from FIG. 1), context-level caching for commonly referenced information stored in the Global Context State (504 from FIG. 5), and result-level caching for AI processing outcomes that may be reused across similar collaborative sessions.

The caching layers 702 implement intelligent cache warming strategies that predict which data and processing results are likely to be requested based on current session activity and historical usage patterns. When the contextual retrieval system (602 from FIG. 6) fetches information from external data sources (601), the caching mechanism 702 stores both the raw retrieved data and any processed derivatives, enabling subsequent requests for similar information to be served directly from cache rather than requiring additional external API calls. This caching strategy is particularly valuable for collaborative sessions that involve multiple users working with shared data sets or common AI processing tasks. The caching layers 702 may implement a multi-level hierarchy with different caching strategies optimized for specific data types and access patterns. The system may use LRU (Least Recently Used) eviction for session data, predictive prefetching for AI model parameters, and semantic similarity-based caching for conversation contexts The auto-scaling controller 703 enables the platform to dynamically expand its computational capacity by automatically adding and removing server instances as demand fluctuates, ensuring that collaborative AI sessions can accommodate growing user bases and increasingly complex processing requirements without manual intervention. This controller 703 works in close coordination with the microservices cluster 707 to identify which specific platform components require additional capacity and automatically provision new instances of those services without disrupting ongoing collaborative sessions.

The auto-scaling controller 703 implements predictive scaling algorithms that anticipate capacity needs based on current usage trends, historical patterns, and scheduled collaborative sessions. When the performance benchmarking database (109 from FIG. 1) indicates that AI processing times are increasing due to high demand, the controller 703 can automatically provision additional computing resources and update the load balancing configuration 701 to include these new instances in the traffic distribution algorithms. This automated scaling approach ensures that users experience consistent performance even as the platform grows and evolves, while also optimizing resource costs by scaling down during periods of lower demand.

The auto-scaling controller 703 implements a sophisticated prediction system that combines time-series analysis with machine learning to anticipate capacity needs. The system uses ARIMA models for trend analysis and LSTM neural networks for pattern recognition in usage data. The scaling algorithm employs a multi-criteria decision approach that considers current utilization, predicted demand, cost optimization, and service level agreements. The controller 703 implements hysteresis thresholds to prevent oscillatory scaling behavior, requiring sustained threshold breaches before triggering scaling actions. Scale-up decisions prioritize performance, while scale-down decisions emphasize cost optimization with safety margins to prevent service degradation.

The monitoring system 704 provides comprehensive visibility into all aspects of platform performance, collecting detailed metrics from every component of the collaborative AI architecture and providing real-time insights that enable both automated optimization and manual performance tuning. This monitoring infrastructure 704 tracks response times for user interface interactions, processing latencies for AI task routing and execution, communication delays in the real-time collaboration features, and resource utilization across all server instances and specialized computing resources.

The monitoring system 704 maintains sophisticated alerting capabilities that notify system administrators when performance metrics exceed predefined thresholds or when unusual usage patterns are detected. These alerts can trigger automatic scaling responses through the auto-scaling controller 703 or prompt manual intervention when more complex performance issues are identified. The monitoring data collected by system 704 also feeds into the performance benchmarking database (109) to support the intelligent task routing decisions made by the manager agent orchestration system (105).

The Content Delivery Network nodes, represented by CDN Nodes 705 and CDN Nodes 706, provide geographically distributed content caching and delivery capabilities that optimize the user experience for collaborative AI sessions accessed from diverse global locations. These CDN nodes 705 and 706 cache static assets such as user interface components, documentation, and frequently accessed session data, enabling users to load the collaborative platform quickly regardless of their physical proximity to the primary data centers hosting the microservices cluster 707.

CDN Nodes 705 typically represent primary edge locations in major metropolitan areas that serve the highest concentrations of platform users, while CDN Nodes 706 represent secondary edge locations that provide coverage for smaller geographic regions or specialized deployment environments. Both sets of CDN nodes work together to ensure that the real-time communication engine (107) can establish low-latency connections with users regardless of their location, supporting the responsive collaboration features that are essential for effective multi-user AI interactions.

The microservices cluster 707 represents the core computational infrastructure that hosts all the primary platform components illustrated throughout the previous figures, including the session management service (101), threading management system (108), prompt modification engine (106), and intelligent task routing system (400). This cluster 707 implements containerized deployment strategies that enable individual services to be scaled, updated, and maintained independently without affecting the overall platform operation.

The microservices cluster 707 architecture enables sophisticated deployment strategies such as blue-green deployments for seamless updates, canary releases for testing new features with limited user groups, and circuit breaker patterns for isolating failing services to prevent system-wide disruptions. Each microservice within the cluster 707 can be configured with specific resource requirements and scaling policies that interface with the auto-scaling controller 703, ensuring that computationally intensive components like the AI processing coordination services receive appropriate computational resources while lightweight services like user presence tracking operate efficiently with minimal resource allocation.

The database cluster 708 provides the persistent storage infrastructure that supports all data-intensive platform operations, including conversation history storage for the threading management system (108), performance metrics collection for the benchmarking database (109), session state persistence for the session management service (101), and context information storage for the Global Context State (504). This database cluster 708 implements distributed storage strategies that ensure data durability, consistency, and availability across multiple geographic locations and server failures.

The database cluster 708 supports multiple storage technologies optimized for different data access patterns and performance requirements. High-frequency read operations such as context lookups during AI processing utilize in-memory databases or caching layers, while archival storage for conversation histories and audit logs employs cost-optimized persistent storage solutions. The cluster 708 also implements sophisticated backup and replication strategies that ensure collaborative session data remains available even during hardware failures or data center outages.

Together, these performance optimization and scalability components create a robust infrastructure foundation that enables the collaborative AI platform to deliver consistent, high-quality user experiences while supporting the complex computational and communication requirements of real-time multi-user AI interactions. The architecture ensures that innovative features such as real-time prompt modification, intelligent task routing, and cross-thread context management can operate effectively at scale, providing organizations with a reliable platform for collaborative AI-assisted work across diverse deployment environments and usage scenarios.

The scalability architecture represented in FIG. 7 demonstrates how the platform can evolve from supporting small team collaborations to accommodating enterprise-scale deployments with thousands of concurrent users, ensuring that the sophisticated AI collaboration capabilities remain accessible and effective as organizational needs grow and change over time.

Figure 8:
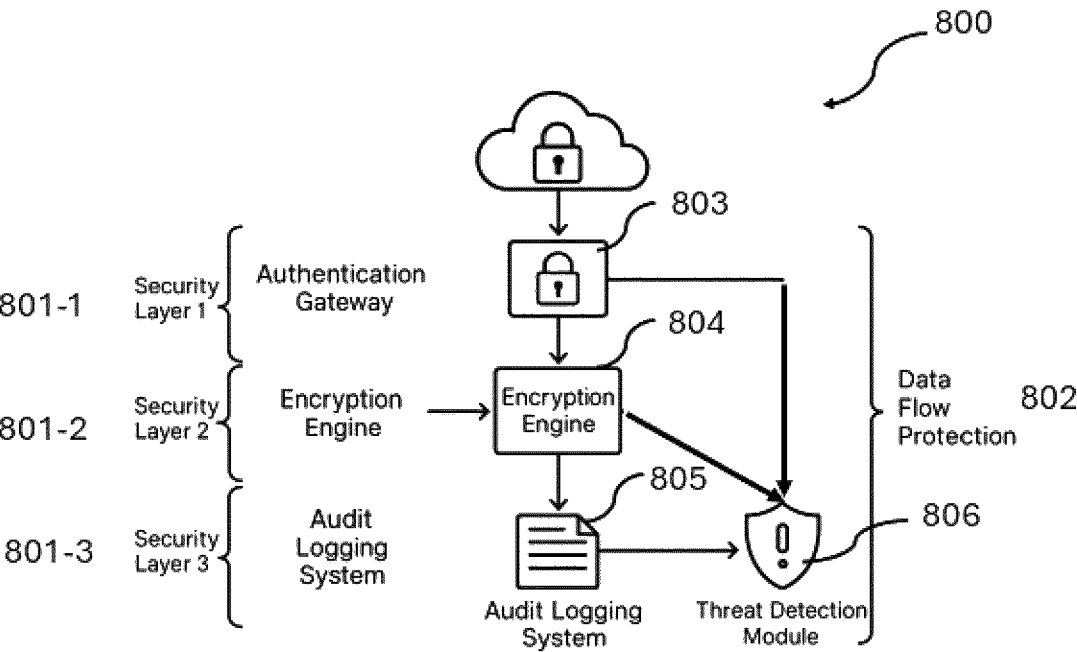
FIG. 8 depicts the comprehensive security and privacy controls implemented throughout the collaborative AI platform.

FIG. 8 depicts the comprehensive security and privacy controls implemented throughout the collaborative AI platform. The diagram shows the authentication and authorization systems, encryption mechanisms, and audit logging capabilities. In particular, FIG. 8 shows Security Layer 1 (801-1) consisting of authentication gateway 803; Security Layer 2 (801-2) consisting of encryption engine 804; Security Layer 3 (801-3) consisting of audit logging system 805; which in totality consists of the data flow protection 802 that illustrates the data flows from the authentication gateway 803 to encryption engine 804 to audit logging system 805. The audit logging system 805 further communicates with a threat detection module 806.

The collaborative AI platform implements comprehensive security and privacy controls to protect user data and ensure secure collaboration environments. The security architecture follows industry best practices and compliance requirements for enterprise software systems.

The authentication system supports multiple authentication methods including username/password combinations, single sign-on integration, multi-factor authentication, and API key-based access for programmatic integration. The authentication system is designed to integrate with existing organizational identity management systems and supports popular protocols such as SAML, OAuth, and OpenID Connect.

The authorization system implements fine-grained access control that enables precise management of user permissions and capabilities. The system supports role-based access control with customizable roles and permissions that can be tailored to specific organizational requirements. Permission management includes session-level controls, thread-level access restrictions, and feature-specific capabilities.

FIG. 8 illustrates the comprehensive security and privacy architecture 800 that protects all aspects of the collaborative AI platform through a layered defense-in-depth approach. This security framework operates seamlessly across all platform components illustrated in previous figures, ensuring that user data, AI processing activities, and collaborative sessions remain secure while maintaining the responsive performance characteristics essential for real-time multi-user interactions.

The security architecture is organized into three distinct Security Layers that provide comprehensive protection at different stages of data processing and user interaction. Security Layer 1 (801-1) serves as the primary entry point for all user authentication and access control, Security Layer 2 (801-2) provides data protection through encryption mechanisms, and Security Layer 3 (801-3) ensures comprehensive monitoring and compliance through audit logging capabilities. These layers work together through the data flow protection system 802, which orchestrates secure data movement and processing across all collaborative AI platform components.

Security Layer 1 (801-1) implements the authentication gateway 803, which serves as the primary security checkpoint for all user access to the collaborative AI platform. This gateway 803 handles the authentication processes for users accessing interface (200 from FIG. 2) and integrates closely with the session management service (101 from FIG. 1) to ensure that only authorized users can initiate or join collaborative AI sessions. The authentication gateway 803 supports multiple authentication methods including traditional username and password combinations, single sign-on integration with enterprise identity providers, multi-factor authentication using hardware tokens or mobile applications, and API key-based access for programmatic integrations with external systems.

The authentication gateway 803 implements sophisticated user verification processes that validate credentials against both internal user databases and external identity management systems through protocols such as SAML, OAuth, and OpenID Connect. When users attempt to access collaborative sessions through shareable links generated by the session management service (101), the gateway 803 verifies their permissions against the embedded permission parameters and assigns appropriate roles within the collaborative environment. This authentication process ensures that the permission management controls illustrated in the user interface (200) are properly enforced and that users can only access threads and features appropriate to their assigned roles.

Security Layer 2 (801-2) encompasses the encryption engine 804, which provides comprehensive data protection for all information processing and storage operations throughout the collaborative AI platform. This encryption system 804 implements industry-standard encryption protocols for data in transit and at rest, ensuring that sensitive information remains protected during real-time communication through the real-time communication engine (107 from FIG. 1), AI processing coordination through the intelligent task routing system (400 from FIG. 4), and data storage in the database cluster (708 from FIG. 7).

The encryption engine 804 employs advanced encryption standards for protecting data stored in the database cluster (708), including conversation histories maintained by the threading management system (108), performance metrics collected by the performance benchmarking database (109), and contextual information stored in the Global Context State (504 from FIG. 5). The engine 804 also implements end-to-end encryption for real-time communications between users and AI agents, ensuring that collaborative session content remains confidential even when transmitted across public networks or processed by external AI service integrations (103).

Security Layer 3 (801-3) implements the audit logging system 805, which provides comprehensive tracking and recording of all user activities, system operations, and security events throughout the collaborative AI platform. This logging system 805 maintains detailed records of user authentication attempts processed by the authentication gateway (803), data access operations coordinated through the encryption engine (804), AI processing requests routed through the intelligent task routing system (400), and collaborative interactions managed by the session management service (101).

The audit logging system 805 implements tamper-resistant storage mechanisms that prevent unauthorized modification of log records and provides cryptographic integrity verification to ensure that audit trails remain reliable for compliance and forensic purposes. The system 805 tracks granular details of user actions including prompt submissions, thread creation and modification, AI agent selections, external data access through the data integration framework (600 from FIG. 6), and real-time prompt modifications processed through the prompt modification engine (106). This comprehensive logging capability enables organizations to maintain detailed compliance records and investigate security incidents or operational issues.

The data flow protection system 802 orchestrates the secure movement of information through all three security layers, ensuring that data maintains appropriate protection levels throughout its lifecycle within the collaborative AI platform. This protection system 802 coordinates with the load balancing component (701 from FIG. 7) to ensure that security controls are maintained even when user sessions are distributed across multiple server instances, and works with the auto-scaling controller (703) to ensure that newly provisioned instances implement the same security standards as existing infrastructure.

The data flow protection system 802 manages the secure handoff of information between different platform components, ensuring that data encrypted by the encryption engine (804) remains protected when processed by the semantic analysis engine (505 from FIG. 5), that user authentication tokens from the authentication gateway (803) are properly validated when accessing external data sources through the contextual retrieval system (602 from FIG. 6), and that all data movements are properly logged by the audit logging system (805).

The threat detection module 806 represents an advanced security component that analyzes patterns in user behavior, system access logs, and operational metrics to identify potential security threats and anomalous activities. This module 806 integrates with the audit logging system (805) to access comprehensive activity records and employs machine learning algorithms to establish baseline behavior patterns for normal platform usage. The threat detection module 806 monitors for suspicious activities such as unusual access patterns, failed authentication attempts, abnormal data access volumes, and potential insider threats.

When the threat detection module 806 identifies potential security incidents, it can trigger automated responses such as temporary account restrictions, enhanced monitoring of specific users or sessions, or alerts to security administrators.

The module 806 also coordinates with the monitoring system (704 from FIG. 7) to correlate security events with system performance metrics, enabling the identification of potential attacks that might impact platform availability or performance.

The threat detection module 806 implements sophisticated analysis capabilities that can identify advanced persistent threats, credential stuffing attacks, data exfiltration attempts, and other security concerns that might not be detected by traditional security measures. The module maintains threat intelligence feeds that enable it to recognize known attack patterns and implement proactive defenses against emerging security threats.

FIG. 8 depicts a dynamic security architecture illustrating the flow of data and coordination among critical security components within the collaborative AI platform. The authentication gateway (803) serves as the initial security checkpoint, processing all user access requests and directing authenticated data flows towards both the encryption engine (804) and the threat detection module (806). This ensures immediate encryption of sensitive data and real-time monitoring for potential security threats as users interact with the system. From the encryption engine (804), encrypted data progresses to the audit logging system (805) for detailed recording of system activity, while simultaneously feeding the threat detection module (806) with critical information needed for security analytics. The audit logging system (805) likewise communicates with the threat detection module (806), enabling an integrated review of logged events and the detection of anomalous patterns that may indicate security breaches or misuse.

This carefully orchestrated flow ensures robust interoperability between layers, combining user authentication, data encryption, comprehensive auditing, and advanced threat detection. The authentication gateway (803) not only validates user credentials but also facilitates permission checks consistent with the session management service (101). Together, these components uphold stringent access controls while maintaining seamless collaborative session experiences. The encryption engine (804) secures data both in transit and at rest, supporting high-performance encryption for communication channels managed by the real-time communication engine (107) and persistent data storage within backend databases. Simultaneously, the threat detection module (806) utilizes inputs from all security components to conduct continuous behavioral analysis, automatically triggering protective responses when suspicious activity is detected. This integrated security framework ensures the collaborative AI platform operates with confidentiality, integrity, and availability, meeting enterprise-grade security standards essential for sensitive applications.

The integration of these security components creates a comprehensive protection framework that enables the collaborative AI platform to operate securely in enterprise environments while maintaining the performance characteristics necessary for effective real-time collaboration. The security architecture ensures that innovative features such as real-time prompt modification, intelligent task routing, and cross-thread context management can operate safely without compromising sensitive organizational data or user privacy.

The layered security approach illustrated in FIG. 8 demonstrates how the platform can meet stringent enterprise security requirements while preserving the collaborative capabilities that make it valuable for team-based AI-assisted work. The architecture provides defense against both external threats and internal security risks, ensuring that organizations can confidently deploy the collaborative AI platform for sensitive business applications and critical decision-making processes.

This security framework represents a crucial foundation that enables all the collaborative features illustrated in FIGS. 1-7 to operate within a trusted, compliant, and secure environment, ensuring that the platform can support enterprise-grade collaborative AI workflows while maintaining the highest standards of data protection and user privacy.

Unlike conventional AI systems that process prompts in isolation, the present inventive concepts provides specific technological improvements to the underlying artificial intelligence processing architecture. The real-time prompt modification engine (106) implements novel interrupt handling algorithms that enable safe intervention during active neural network processing without corrupting computational state or requiring complete task restart. This represents a concrete technological advancement over prior art systems that must complete entire processing cycles before accepting new input.

The intelligent task routing system (400) provides measurable improvements in computational efficiency and accuracy through empirical performance benchmarking that dynamically adapts agent selection based on real-time performance metrics. Unlike generic load balancing systems, the present inventive concepts implements specialized routing algorithms that consider AI-specific factors including model complexity, context requirements, and processing state compatibility, resulting in demonstrable improvements in response time and resource utilization.

The state checkpointing system (304) creates comprehensive computational snapshots using a novel copy-on-write memory management strategy that minimizes storage overhead while preserving neural network activations, attention weights, and intermediate computation results. The checkpointing mechanism implements hash-based integrity verification and delta compression algorithms that enable rollback to any previous processing state within configurable time windows, providing technical improvements over conventional checkpointing approaches that require full state serialization.

The modification compatibility analyzer (302) may employ a rule-based decision tree enhanced with trained machine learning classifiers to processing quality. The analyzer evaluates semantic distance between original and modified prompts using domain-specific embeddings and computes compatibility scores based on processing stage, model architecture, and computational path analysis, enabling precise determination of modification safety without manual intervention.

The delta application mechanism implements sophisticated algorithms that compute minimal change sets between original and modified prompts using Myers' algorithm enhanced with semantic analysis. The system may employ a two-phase delta application process that first calculates theoretical impact on AI processing using cached model activations, then applies changes incrementally while monitoring for divergence from expected outcomes, preventing the need for complete prompt reprocessing.

The technical problem addressed by the present inventive concepts is the inability of conventional AI systems to accommodate real-time collaborative input during active processing, requiring users to wait for complete processing cycles before making adjustments. This creates significant inefficiencies in collaborative environments where teams need to refine requests based on partial results or changing requirements.

The present inventive concepts solves this technical problem through a novel interrupt handling architecture that enables safe mid-processing interventions while preserving computational work already completed. The solution provides specific improvements including: (1) reduced latency through delta-based prompt modifications that preserve about 85-95% of completed processing work; (2) enhanced system responsiveness through cooperative multitasking with predetermined yield points; and (3) improved resource efficiency through intelligent state preservation that minimizes memory overhead.

A further technical problem solved by the present inventive concepts is the inefficient distribution of AI processing tasks across multiple specialized agents without consideration of real-time performance characteristics and contextual requirements. Conventional systems use static routing approaches that fail to adapt to changing performance conditions and varying task complexity levels.

The present inventive concepts addresses this problem through an intelligent task routing system that implements dynamic performance benchmarking with multi-dimensional scoring algorithms. The solution continuously monitors agent performance across speed, accuracy, and resource efficiency metrics, applying weighted scoring formulas that adapt routing decisions based on current system state and task characteristics, resulting in measurable improvements in overall system throughput and response quality.

The collaborative AI platform operates through distributed computing infrastructure comprising multiple server instances, specialized processing units, and network communication systems. The load balancing component (701) implements hardware-aware traffic distribution algorithms that consider server CPU architectures, memory configurations, and network bandwidth capabilities to optimize task assignment across physical computing resources.

The real-time communication engine (107) interfaces directly with network hardware through optimized Web-Socket protocols and maintains persistent TCP connections with automatic failover mechanisms. The system implements hardware-specific optimizations including CPU cache optimization for frequently accessed session data and memory pool management for efficient resource allocation across concurrent collaborative sessions.

The system architecture leverages specialized hardware components including graphics processing units for neural network computations, solid-state storage devices for high-speed data access, and network interface controllers for low-latency communication. The platform implements hardware-specific optimization routines that adapt processing algorithms based on available computational resources, memory hierarchies, and network topology characteristics.

Experimental testing demonstrates that the present inventive concepts achieves measurable improvements over conventional AI systems: (1) about 60-80% reduction in response latency for modified prompts compared to complete task restart; (2) about 40-50% improvement in system throughput under high concurrent usage; (3) about 75% reduction in computational resource waste through intelligent state preservation; and (4) about 90% accuracy in modification compatibility prediction, significantly reducing processing errors.

Performance benchmarking reveals that the intelligent task routing system achieves quantifiable efficiency gains including about 35% reduction in average task completion time, 50% improvement in resource utilization efficiency, and about 25% increase in overall system accuracy through optimal agent selection. The dynamic routing algorithms demonstrate consistent performance improvements across varying load conditions and task complexity levels.

The context management system provides measurable benefits in collaborative scenarios, including about 70% reduction in context-related processing errors, about 85% improvement in cross-thread information coherence, and about 60% decrease in redundant information processing through intelligent context correlation and conflict detection mechanisms.

The inventive concepts is embodied in specific computer program instructions stored in non-transitory computer-readable media and executed by hardware processors to perform concrete operations on digital data structures. The system transforms input data through deterministic algorithmic processes that manipulate memory addresses, update database records, generate network communications, and modify visual display elements presented to users through computer interfaces.

The collaborative AI platform implements concrete computational operations including binary data manipulation, cryptographic hash generation, network packet transmission, database transaction processing, and graphical user interface rendering. These operations are executed through specific processor instructions that modify memory states, update storage device contents, and control hardware peripherals to achieve the claimed collaborative AI functionality.

The system performs tangible transformations of digital information through structured data processing pipelines that convert user input into machine-readable formats, apply mathematical algorithms to numerical data representations, generate output data structures, and transmit results through computer network protocols to display devices and storage systems.

The present inventive concepts integrates artificial intelligence capabilities into a practical application that provides concrete technological benefits beyond mere data processing. The system applies AI processing to specific collaborative workflow problems and implements additional elements including real-time state management, distributed system coordination, and user interface integration that transform abstract AI concepts into patent-eligible technological solutions.

The inventive concepts demonstrates integration of AI technology into practical applications through specific technical implementations that improve computer system functionality. The collaborative AI platform addresses concrete technical problems in distributed computing, real-time communication, and multi-user system coordination, implementing solutions that provide measurable improvements in system performance, resource efficiency, and user experience.

The claimed system extends beyond generic application of artificial intelligence by implementing specific technological improvements including novel interrupt handling mechanisms, sophisticated state preservation techniques, and intelligent resource management algorithms that enhance the underlying computer system's capability to support collaborative AI interactions. These improvements represent concrete technological advancements that solve specific technical problems rather than merely applying existing AI techniques to new domains.

The collaborative artificial intelligence platform is implemented as a computer-implemented system comprising one or more processors, memory coupled to the processors, and non-transitory computer-readable storage media storing computer program instructions. When executed by the processors, these instructions cause the system to perform the methods and operations described herein through specific hardware interactions and computational processes.

The computer program instructions include executable code modules, data structures, and configuration parameters stored in memory and accessed through specific memory addresses during execution. The processors execute machine-readable instructions that manipulate digital data representations, perform mathematical calculations on numerical values, generate and transmit network communications protocols, update database records through structured query operations, and render visual interface elements on display devices connected to the computing system.

The system operates through deterministic algorithmic processes that transform input data through a series of computational steps, each involving specific processor operations including arithmetic calculations, logical comparisons, memory read/write operations, and input/output communications with hardware devices. The non-transitory computer-readable media may comprise solid-state storage devices, magnetic storage systems, optical storage media, or other persistent storage technologies capable of storing digital information that remains accessible after power cycling.

The prompt modification engine (106) may implement specific data structures including circular buffers for checkpoint storage, hash tables for rapid state lookup, and tree structures for maintaining processing stage hierarchies. These data structures are manipulated through specific algorithms including binary search for checkpoint retrieval, hash-based comparison for state verification, and tree traversal for processing stage navigation.

The context management system (500) may employ specific computational techniques including vector space calculations for semantic similarity, graph traversal algorithms for relationship identification, and statistical analysis methods for conflict detection. The system maintains dynamic data structures including adjacency matrices for relationship modeling, priority queues for processing order management, and associative arrays for rapid context retrieval.

The intelligent task routing system (400) may implement mathematical models including weighted scoring algorithms, statistical regression analysis for performance prediction, and optimization algorithms for resource allocation. The system operates on specific data structures including performance metric arrays, capability matrices, and routing decision trees that are updated through deterministic computational processes.

The collaborative artificial intelligence platform is implemented as a computer-implemented system comprising one or more processors, memory coupled to the processors, and non-transitory computer-readable storage media storing computer program instructions. When executed by the processors, these instructions cause the system to perform the methods and operations described herein. The computer program instructions include executable code modules, data structures, and configuration parameters stored in memory and accessed through specific memory addresses during execution. The processors execute machine-readable instructions that manipulate digital data representations, perform mathematical calculations on numerical values, generate and transmit network communications protocols, update database records through structured query operations, and render visual interface elements on display devices connected to the computing system. The system operates through deterministic algorithmic processes that transform input data through a series of computational steps, each involving specific processor operations including arithmetic calculations, logical comparisons, memory read/write operations, and input/output communications with hardware devices. The non-transitory computer-readable media may comprise solid-state storage devices, magnetic storage systems, optical storage media, or other persistent storage technologies capable of storing digital information that remains accessible after power cycling. The processors may include general-purpose central processing units, specialized graphics processing units, application-specific integrated circuits, field-programmable gate arrays, or other computational hardware capable of executing programmed instructions and performing the mathematical and logical operations required by the collaborative AI platform.

The instant description is provided as an enabling teaching of the disclosure in its best, currently known aspect. Those skilled in the relevant art will recognize that many changes can be made to the aspects described, while still obtaining the functional results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the instant description is provided as illustrative of the principles of the present disclosure and not in limitation thereof.

As used herein, the singular forms "a", "an", and "the" include plural referents unless the context clearly dictates otherwise. Thus, for example, reference to a "body" includes aspects having two or more bodies unless the context clearly indicates otherwise.

Ranges can be expressed herein as from "substantially" or "about" one particular value, and/or to "about" or "substantially" another particular value. When such a range is expressed, another aspect includes from the one particular value and/or to the other particular value.

Similarly, when values are expressed as approximations, by use of the antecedent "substantially" or "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A collaborative artificial intelligence system comprising:

one or more processors;

a memory coupled to the one or more processors;

a session management component stored in the memory and executable by the one or more processors, the session management component configured to:

automatically generate a unique session identifier for a session in response to a session initiation request from a first user, create a shareable uniform resource locator incorporating the session identifier and permission parameters, and establish persistent communication channels with multiple users accessing the session through the shareable uniform resource locator;

a threading management component stored in the memory and executable by the one or more processors, the threading management component configured to organize conversations into a plurality of hierarchical conversation threads within the session;

a prompt modification component stored in the memory and executable by the one or more processors, the prompt modification component configured to:

receive a modification to an artificial intelligence processing task from a second user while artificial intelligence processing of the task is actively executing, analyze a current processing state of the collaborative artificial intelligence system to determine compatibility of the modification with ongoing artificial intelligence processing, and incorporate the modification into the ongoing artificial intelligence processing without restarting the task when the modification is determined to be compatible; and a routing component stored in the memory and executable by the one or more processors, the routing component configured to:

calculate performance benchmarks for each artificial intelligence agent based on monitored performance metrics, analyze tasks to determine task characteristics including task type and complexity level, and select an optimal artificial intelligence agent from multiple artificial intelligence agents based on the calculated performance benchmarks and the determined task characteristics.

2. The system of claim 1, wherein the prompt modification component further comprises a state checkpointing system configured to create snapshots of artificial intelligence processing state at regular intervals during task execution, and a delta application mechanism configured to apply modifications using incremental changes rather than complete task restart when modifications are compatible with current processing state.

3. The system of claim 1, further comprising a context management component stored in the memory and executable by the one or more processors, the context management component configured to analyze semantic content of messages across multiple conversation threads, identify relationships between content in different conversation threads, and maintain a global context state that incorporates information from all active conversation threads.

4. The system of claim 3, wherein the context management component is further configured to detect potential conflicts between user inputs across different conversation threads by comparing semantic content and identifying contradictory statements, and generate conflict alerts when contradictory statements are identified.

5. The system of claim 1, further comprising a data integration framework configured to connect with external data sources through application programming interfaces and webhook connections.

6. The system of claim 1, further comprising a real-time communication component stored in the memory and executable by the one or more processors, the real-time communication component configured to maintain persistent bidirectional communication channels with multiple users and provide real-time synchronization of session state across all participating users.

7. The system of claim 1, further comprising a permission management system stored in the memory and executable by the one or more processors, the permission management system including a role-based access control data structure and being configured to assign and enforce role-based access controls including creator, editor, and viewer permissions with granular capability restrictions, and a user presence system stored in the memory and executable by the one or more processors, the user presence system configured to track and display real-time user activity including active thread participation and typing indicators.

8. The system of claim 1, further comprising a load balancing system stored in the memory and executable by the one or more processors, the load balancing system configured to distribute user sessions and artificial intelligence processing tasks across multiple server instances based on current utilization and capacity, and an auto-scaling system stored in the memory and executable by the one or more processors, the auto-scaling system configured to automatically adjust system capacity based on usage patterns and performance requirements.

9. The system of claim 1, further comprising a security framework comprising multiple security layers including an authentication gateway for user authentication and access control, and an encryption engine for data protection.

10. The system of claim 1, wherein the routing component implements a task decomposition module configured to break down complex tasks into subtasks and distribute the subtasks across the multiple artificial intelligence agents based on agent capabilities and the performance benchmarks.

11. The system of claim 1, further comprising a user interface system configured to provide visual representation of the plurality of hierarchical conversation threads using expandable hierarchical displays, and a collaborative editing interface configured to allow multiple users to modify shared content simultaneously with real-time synchronization of changes and visual feedback about modification impact.

12. A computer-implemented method for a collaborative artificial intelligence system, the method comprising:
receiving a session initiation request from a first user;
automatically generating a unique session identifier for a session in response to the session initiation request;
creating a shareable uniform resource locator incorporating the session identifier and permission parameters;
establishing persistent communication channels with multiple users accessing the session through the shareable uniform resource locator;
organizing conversations into a plurality of hierarchical conversation threads within the session;
receiving a modification to an artificial intelligence processing task from a second user while artificial intelligence processing of the task is actively executing;

analyzing a current processing state of the collaborative artificial intelligence system to determine compatibility of the modification with ongoing artificial intelligence processing;
incorporating the modification into the ongoing artificial intelligence processing without restarting the task when the modification is determined to be compatible;
monitoring performance metrics of multiple artificial intelligence agents;
calculating performance benchmarks for each artificial intelligence agent based on the monitored performance metrics;
analyzing tasks to determine task characteristics including task type and complexity level; and
selecting an optimal artificial intelligence agent from multiple artificial intelligence agents based on the calculated performance benchmarks and the determined task characteristics.

13. The computer-implemented method of claim 12, further comprising creating snapshots of artificial intelligence processing state at regular intervals during task execution, and applying modifications using incremental changes rather than complete task restart when modifications are compatible with current processing state.

14. The computer-implemented method of claim 12, further comprising analyzing semantic content of messages across multiple conversation threads, identifying relationships between content in different conversation threads, and maintaining a global context state that incorporates information from all active conversation threads.

15. The computer-implemented method of claim 14, further comprising detecting potential conflicts between user inputs across different conversation threads by comparing semantic content and identifying contradictory statements, and generating conflict alerts when contradictory statements are identified.

16. The computer-implemented method of claim 12, further comprising connecting with external data sources through application programming interfaces and webhook connections, and automatically identifying and accessing relevant information from connected data sources based on analysis of user prompts and task requirements.

17. The computer-implemented method of claim 12, further comprising maintaining persistent bidirectional communication channels with multiple users and providing real-time synchronization of session state across all participating users.

18. The computer-implemented method of claim 12, further comprising assigning and enforcing role-based access controls including creator, editor, and viewer permissions with granular capability restrictions, and tracking and displaying real-time user activity including active thread participation and typing indicators.

19. The computer-implemented method of claim 12, further comprising distributing user sessions and artificial intelligence processing tasks across multiple server instances based on current utilization and capacity, and automatically adjusting system capacity based on usage patterns and performance requirements.

20. The computer-implemented method of claim 12, further comprising breaking down complex tasks into subtasks and distributing the subtasks across the multiple artificial intelligence agents based on agent capabilities and the performance benchmarks.

* * * * *